(12) United States Patent
Maeta et al.

(10) Patent No.: US 11,568,688 B2
(45) Date of Patent: Jan. 31, 2023

(54) SIMULATION OF AUTONOMOUS VEHICLE TO IMPROVE SAFETY AND RELIABILITY OF AUTONOMOUS VEHICLE

(71) Applicant: Motional AD LLC, Boston, MA (US)

(72) Inventors: Silvio Maeta, Pittsburgh, PA (US); Ankita Nugyal, Singapore (SG)

(73) Assignee: MOTIONAL AD LLC, Boston, MA (US)

( * ) Notice: Subject to any disclaimer, the term of this patent is extended or adjusted under 35 U.S.C. 154(b) by 309 days.

(21) Appl. No.: 17/002,752

(22) Filed: Aug. 25, 2020

(65) Prior Publication Data
US 2022/0068052 A1    Mar. 3, 2022

(51) Int. Cl.
| | |
|---|---|
| *G07C 5/08* | (2006.01) |
| *G07C 5/00* | (2006.01) |
| *G09B 9/042* | (2006.01) |

(52) U.S. Cl.
CPC .......... *G07C 5/0816* (2013.01); *G07C 5/008* (2013.01); *G07C 5/0808* (2013.01); *G09B 9/042* (2013.01)

(58) Field of Classification Search
CPC .... G07C 5/0816; G07C 5/008; G07C 5/0808; G09B 9/042; G06F 30/20; G06Q 10/047; G08B 29/185; B60W 30/08; B60W 30/095; B60W 50/0205; B60W 50/0098; B60W 10/18; B60W 50/14; B60W 60/001; B60W 2050/0028; B60W 2556/45; B60W 2050/0031; B60W 2050/0029;

(Continued)

(56) References Cited

U.S. PATENT DOCUMENTS

| | | | | |
|---|---|---|---|---|
| 10,482,003 | B1 * | 11/2019 | Bondor | ............... G06F 11/3684 |
| 2018/0033627 | A1 * | 2/2018 | Dainese | ............... H01L 21/2256 |
| 2020/0039528 | A1 * | 2/2020 | Ewert | ................... G01S 7/4021 |

(Continued)

FOREIGN PATENT DOCUMENTS

| | | |
|---|---|---|
| CN | 111505965 | 8/2020 |
| DE | 102020210789 | 3/2021 |

(Continued)

OTHER PUBLICATIONS

[No Author Listed], "SAE International: Surface Vehicle Recommended Practice," J3016, Sep. 30, 2016, 30 pages.

(Continued)

*Primary Examiner* — Sizo B Vilakazi
(74) *Attorney, Agent, or Firm* — Fish & Richardson P.C.

(57) ABSTRACT

A system is described that can include a first database, a simulator, and a second database. The first database can store data indicating operation of at least one module within a computing device of an autonomous vehicle. The simulator can receive the stored data from the first database. The simulator can generate, based on the received data, a simulation of the operation of the at least one module. The simulator can identify at least one portion of the simulation that indicates a deviation between the collected data and the simulated operation of the autonomous vehicle. The simulator can analyze the at least one portion of the simulation to generate metrics for the at least one portion of the simulation. The metrics can be used to avoid another deviation between the collected data and the simulated operation of the autonomous vehicle. The second database can store the metrics.

31 Claims, 18 Drawing Sheets

(58) Field of Classification Search
CPC .. G05D 1/0088; G05D 1/0061; G05D 1/0214; B60T 17/18
See application file for complete search history.

(56) References Cited

U.S. PATENT DOCUMENTS

| | | | |
|---|---|---|---|
| 2020/0050536 A1* | 2/2020 | Nygaard | G06F 11/3684 |
| 2022/0068052 A1* | 3/2022 | Maeta | G07C 5/0816 |
| 2022/0187837 A1* | 6/2022 | Tebbens | B60W 50/045 |

FOREIGN PATENT DOCUMENTS

| | | |
|---|---|---|
| JP | 2019185783 | 10/2019 |
| KR | 1992-0014655 | 8/1992 |
| KR | 2013-0091907 | 8/2013 |
| KR | 2018-0049029 | 5/2018 |
| KR | 2020-0019696 | 2/2020 |
| KR | 2020-0023600 | 3/2020 |
| KR | 2020-0106131 | 9/2020 |

OTHER PUBLICATIONS

OEE Work Product, KR10-2020-0139134 Notice of Allowance of Patent Translation dated Feb. 3, 2022 (13 pages).
KR10-2020-0139134 Office Action Translation dated Aug. 24, 2021 (6 pages).

* cited by examiner

SIMULATION OF AUTONOMOUS VEHICLE TO IMPROVE SAFETY AND RELIABILITY OF AUTONOMOUS VEHICLE

TECHNICAL FIELD

This description generally relates to generating metrics during simulation of operation of one or more modules of an autonomous vehicle and using those metrics to improve safety and reliability of the autonomous vehicle.

BACKGROUND

Various simulation techniques exist for testing of autonomous vehicles (AVs). In conventional techniques, a simulation of the testing environment is created to enable the AV to detect objects in environment, navigate through different weather conditions (e.g. rain or daylight). Such techniques are however are not sufficient to adequately improve the safety and reliability of AVs. For example, such traditional techniques often fail to diagnose and treat (a) false generation of alerts when a collision of the AV is unlikely (i.e. false positives) and (b) failure in generation of alerts when collision is likely (i.e. false negatives). Additionally, when a takeover occurs in an attempt to prevent a collision, such techniques do not assess whether a collision would have likely occurred had the takeover not occurred, and thus may often generate inaccurate alerts.

BRIEF DESCRIPTION OF THE DRAWINGS

Like reference characters in various drawings indicate like elements or components.

DETAILED DESCRIPTION

Figure 1:
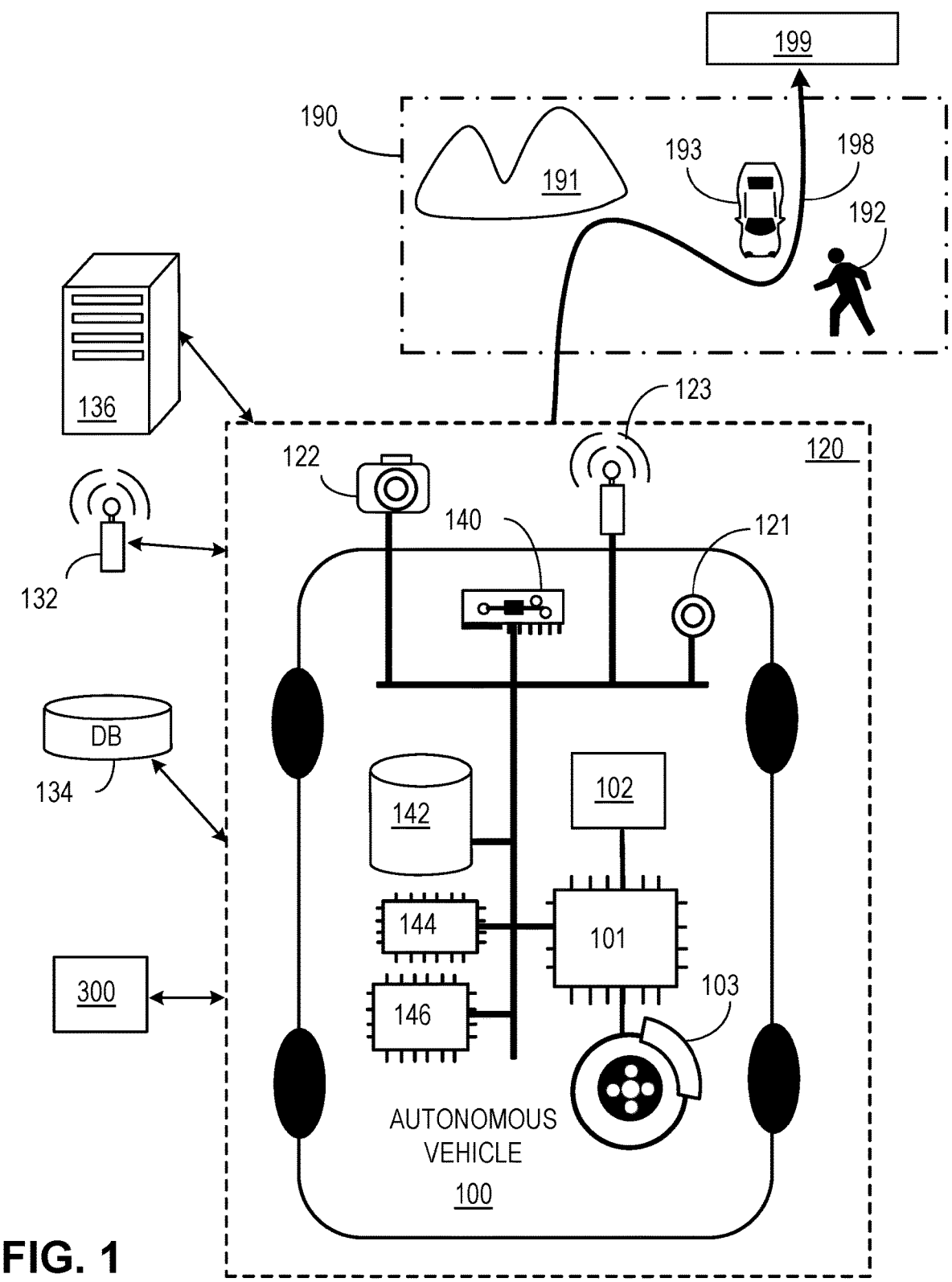
FIG. 1 shows an example of an autonomous vehicle (AV) having autonomous capability.

In the following description, for the purposes of explanation, numerous specific details are set forth in order to provide a thorough understanding. It will be apparent, however, that some implementations may be practiced without these specific details. In other instances, well-known structures and devices are shown in block diagram form in order to avoid unnecessarily obscuring various implementations.

In the drawings, specific arrangements or orderings of schematic elements, such as those representing devices, modules, instruction blocks and data elements, are shown for ease of description. However, it should be understood by those skilled in the art that the specific ordering or arrangement of the schematic elements in the drawings is not meant to imply that a particular order or sequence of processing, or separation of processes, is required. Further, the inclusion of a schematic element in a drawing is not meant to imply that such element is required in all embodiments or that the features represented by such element may not be included in or combined with other elements in some embodiments.

Further, in the drawings, where connecting elements, such as solid or dashed lines or arrows, are used to illustrate a connection, relationship, or association between or among two or more other schematic elements, the absence of any such connecting elements is not meant to imply that no connection, relationship, or association can exist. In other words, some connections, relationships, or associations between elements are not shown in the drawings so as not to obscure the disclosure. In addition, for ease of illustration, a single connecting element is used to represent multiple connections, relationships or associations between elements. For example, where a connecting element represents a communication of signals, data, or instructions, it should be understood by those skilled in the art that such element represents one or multiple signal paths (e.g., a bus), as may be needed, to affect the communication.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Several features are described hereafter that can each be used independently of one another or with any combination of other features. However, any individual feature may not address any of the problems discussed above or might only address one of the problems discussed above. Some of the problems discussed above might not be fully addressed by any of the features described herein. Although headings are provided, information related to a particular heading, but not found in the section having that heading, may also be found elsewhere in this description. Embodiments are described herein according to the following outline:

1. General Overview
2. System Overview
3. Autonomous Vehicle Architecture
4. Autonomous Vehicle Inputs 5. Autonomous Vehicle Planning
6. Autonomous Vehicle Control
7. Simulation environment to improve safety and reliability of AV by reducing generation of false positives and false negatives
8. Simulation environment to improve safety and reliability of AV by improving accuracy of a future alert indicating another potential collision General Overview In one aspect, data collected by a computing device of an autonomous vehicle (AV) is used to generate a simulation of the AV. The simulation is compared with the collected data to determine a deviation between the collected data and the simulation. In one example, such deviation can denote a false positive by the computing device, where the collected data indicates that the AV detected (e.g. generated an alert for) a particular type of event or scenario (e.g. potential collision) while the simulated operation indicates that the detection (e.g. alert) is false. In another example, such deviation can denote a false negative by the computing device, where the collected data indicates that the computing device failed to detect (e.g. indicate an alert) for a particular type of event or scenario (e.g. potential collision) while the simulated operation indicates that event or scenario (e.g. a potential collision). Identification of such false positives and false negatives can be used to generate metrics that prevent the computing device from generating such false positives or false negatives.

While the detection of the event or scenario is described as being conveyed to a driver by way of an alert, in other implementations the detection may not be conveyed to the driver. The detection of a collision can be performed by a collision avoidance module within a software stack of the AV. While the event or scenario is described as a collision, in other implementations the event or scenario can be any other event or scenario as detected by any other module within the software stack, such as a localization module, a planning module, a perception module, a control module, and/or the like.

This aspect offers various advantages. For example, prevention of false positives can reduce (e.g. minimize) the number of false detections (e.g. alerts) of upcoming events or scenarios (e.g. collisions) as generated by the computing device of an AV. Such reduction in number of false detections (e.g. alerts) can reduce the number of times an unnecessary intervention (e.g. by a driver or a remote controller) is needed during the operation of an AV. This enhances the reliability of the AV, and instills confidence in the operations of the AV. Furthermore, prevention of false negatives can ensure the computing device of the AV detects (e.g. generates alerts indicating) a particular event or scenario (e.g. potential collision). This can advantageously prevent undesirable events or scenarios (e.g. prevent collisions). Such prevention of undesirable events or scenarios (e.g. collisions) can enhance the safety and reliability of the AV.

In another aspect, data collected by a computing device of an AV is used to generate a simulation of the AV. The simulation is reviewed to identify a portion of the simulation when a takeover from an autopilot mode occurred in response to detection of (e.g. generation by the computing device of an alert indicating) an event or scenario (e.g. potential collision). That portion of the simulation is analyzed to determine metrics indicating whether an event or scenario (e.g. a collision) would have likely occurred (i.e. probability of such event or scenario such as collision occurring was more than a threshold value) had the takeover not occurred. Such metrics are transmitted to the computing device that can use them to use the metrics to improve accuracy of a future detection of (e.g. alert indicating) another event or scenario (e.g. another potential collision).

While the detection of the event or scenario is described as being conveyed to a driver by way of an alert, in other implementations the detection may not be conveyed to the driver. The detection of a collision can be performed by a collision avoidance module within a software stack of the AV. While the event or scenario is described as a collision, in other implementations the event or scenario can be any other event or scenario as detected by any other module within the software stack, such as a localization module, a planning module, a perception module, a control module, and/or the like.

This other aspect also offers various advantages. For example, the accuracy of a future detection of (e.g. alert indicating) another event or scenario (e.g. potential collision) is improved, which in turn reduces the events or scenarios (e.g. collisions) experienced by the AV, thereby making the AV safe and more reliable. Further, in some implementations, such detection (e.g. generation of alert) can initiate an automatic takeover by a remote system, which can be advantageous in cases where there is no human driver, or the human driver is inattentive or careless. This further enhances the reliability of the AV. In some examples, such detection may be made (e.g. alert may be generated) in response to change in vitals of a driver (which can be the case if the driver is experiencing a medical difficulty such as a heart attack), in which case the alert can initiate an automatic takeover by a remote system.

The aspects described above are further advantageous. For example, in some implementations, the collected data can be operational data for any AV manufactured by any manufacturer, not necessarily the manufacturer that generates the metrics to improve the reliability and safety of that AV. Thus, logs of operational data of an AV manufactured by any manufacturer can be collected to render improvements of that AV, thereby allowing the technical implementations described herein to benefit the AV industry at large. Moreover, the simulation system can be modified to simulate any module within the software stack of the AV, and is thus not limited to simulation of any particular one or more modules. This advantageously allows any module to be plugged in to the simulation system without modifying (or without substantially modifying) the architecture of the simulation system. Not needing to modify architecture prevents a user of the simulation system from rewriting code for the simulation, thereby making the simulation system easier to use. Further, the techniques described herein can be further scaled from AVs to any other robotic systems so as improve the reliability and safety of such robotic systems.

System Overview

FIG. 1 shows an example of an autonomous vehicle (AV) 100 having autonomous capability.

As used herein, the term "autonomous capability" refers to a function, feature, or facility that enables a vehicle to be partially or fully operated without real-time human intervention, including without limitation fully autonomous vehicles, highly autonomous vehicles, and conditionally autonomous vehicles.

As used herein, an AV is a vehicle that possesses autonomous capability.

As used herein, "vehicle" includes means of transportation of goods or people. For example, cars, buses, trains, airplanes, drones, trucks, boats, ships, submersibles, dirigibles, etc. A driverless car is an example of a vehicle.

As used herein, "trajectory" refers to a path or route to navigate an AV from a first spatiotemporal location to second spatiotemporal location. In an embodiment, the first spatiotemporal location is referred to as the initial or starting location and the second spatiotemporal location is referred to as the destination, final location, goal, goal position, or goal location. In some examples, a trajectory is made up of one or more segments (e.g., sections of road) and each segment is made up of one or more blocks (e.g., portions of a lane or intersection). In an embodiment, the spatiotemporal locations correspond to real world locations. For example, the spatiotemporal locations are pick up or drop-off locations to pick up or drop-off persons or goods.

As used herein, "sensor(s)" includes one or more hardware components that detect information about the environment surrounding the sensor. Some of the hardware components can include sensing components (e.g., image sensors, biometric sensors), transmitting and/or receiving components (e.g., laser or radio frequency wave transmitters and receivers), electronic components such as analog-to-digital converters, a data storage device (such as a RAM and/or a nonvolatile storage), software or firmware components and data processing components such as an ASIC (application-specific integrated circuit), a microprocessor and/or a microcontroller.

As used herein, a "scene description" is a data structure (e.g., list) or data stream that includes one or more classified or labeled objects detected by one or more sensors on the AV vehicle or provided by a source external to the AV.

As used herein, a "road" is a physical area that can be traversed by a vehicle, and may correspond to a named thoroughfare (e.g., city street, interstate freeway, etc.) or may correspond to an unnamed thoroughfare (e.g., a driveway in a house or office building, a section of a parking lot, a section of a vacant lot, a dirt path in a rural area, etc.). Because some vehicles (e.g., 4-wheel-drive pickup trucks, sport utility vehicles, etc.) are capable of traversing a variety of physical areas not specifically adapted for vehicle travel, a "road" may be a physical area not formally defined as a thoroughfare by any municipality or other governmental or administrative body.

As used herein, a "lane" is a portion of a road that can be traversed by a vehicle. A lane is sometimes identified based on lane markings. For example, a lane may correspond to most or all of the space between lane markings, or may correspond to only some (e.g., less than 50%) of the space between lane markings. For example, a road having lane markings spaced far apart might accommodate two or more vehicles between the markings, such that one vehicle can pass the other without traversing the lane markings, and thus could be interpreted as having a lane narrower than the space between the lane markings, or having two lanes between the lane markings. A lane could also be interpreted in the absence of lane markings. For example, a lane may be defined based on physical features of an environment, e.g., rocks and trees along a thoroughfare in a rural area or, e.g., natural obstructions to be avoided in an undeveloped area. A lane could also be interpreted independent of lane markings or physical features. For example, a lane could be interpreted based on an arbitrary path free of obstructions in an area that otherwise lacks features that would be interpreted as lane boundaries. In an example scenario, an AV could interpret a lane through an obstruction-free portion of a field or empty lot. In another example scenario, an AV could interpret a lane through a wide (e.g., wide enough for two or more lanes) road that does not have lane markings. In this scenario, the AV could communicate information about the lane to other AVs so that the other AVs can use the same lane information to coordinate path planning among themselves.

The term "over-the-air (OTA) client" includes any AV, or any electronic device (e.g., computer, controller, IoT device, electronic control unit (ECU)) that is embedded in, coupled to, or in communication with an AV.

The term "over-the-air (OTA) update" means any update, change, deletion or addition to software, firmware, data or configuration settings, or any combination thereof, that is delivered to an OTA client using proprietary and/or standardized wireless communications technology, including but not limited to: cellular mobile communications (e.g., 2G, 3G, 4G, 5G), radio wireless area networks (e.g., WiFi) and/or satellite Internet.

The term "edge node" means one or more edge devices coupled to a network that provide a portal for communication with AVs and can communicate with other edge nodes and a cloud based computing platform, for scheduling and delivering OTA updates to OTA clients.

The term "edge device" means a device that implements an edge node and provides a physical wireless access point (AP) into enterprise or service provider (e.g., VERIZON, AT&T) core networks. Examples of edge devices include but are not limited to: computers, controllers, transmitters, routers, routing switches, integrated access devices (IADs), multiplexers, metropolitan area network (MAN) and wide area network (WAN) access devices.

"One or more" includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this description, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

As used herein, an AV system refers to the AV along with the array of hardware, software, stored data, and data generated in real-time that supports the operation of the AV. In an embodiment, the AV system is incorporated within the AV. In an embodiment, the AV system is spread across several locations. For example, some of the software of the AV system is implemented on a cloud computing environment similar to cloud computing environment 300 described below with respect to FIG. 3.

In general, this document describes technologies applicable to any vehicles that have one or more autonomous capabilities including fully autonomous vehicles, highly autonomous vehicles, and conditionally autonomous vehicles, such as so-called Level 5, Level 4 and Level 3 vehicles, respectively (see SAE International's standard J3016: Taxonomy and Definitions for Terms Related to On-Road Motor Vehicle Automated Driving Systems, which is incorporated by reference in its entirety, for more details on the classification of levels of autonomy in vehicles). The technologies described in this document are also applicable to partially autonomous vehicles and driver assisted vehicles, such as so-called Level 2 and Level 1 vehicles (see SAE International's standard J3016: Taxonomy and Definitions for Terms Related to On-Road Motor Vehicle Automated Driving Systems). In an embodiment, one or more of the Level 1, 2, 3, 4 and 5 vehicle systems may automate certain vehicle operations (e.g., steering, braking, and using maps) under certain operating conditions based on processing of sensor inputs. The technologies described in this document can benefit vehicles in any levels, ranging from fully autonomous vehicles to human-operated vehicles.

AVs have advantages over vehicles that require a human driver. One advantage is safety. For example, in 2016, the United States experienced 6 million automobile accidents, 2.4 million injuries, 40,000 fatalities, and 13 million vehicles in crashes, estimated at a societal cost of $910+ billion. U.S. traffic fatalities per 100 million miles traveled have been reduced from about six to about one from 1965 to 2015, in part due to additional safety measures deployed in vehicles. For example, an additional half second of warning that a crash is about to occur is believed to mitigate 60% of front-to-rear crashes. However, passive safety features (e.g., seat belts, airbags) have likely reached their limit in improving this number. Thus, active safety measures, such as automated control of a vehicle, are the likely next step in improving these statistics. Because human drivers are believed to be responsible for a critical pre-crash event in 95% of crashes, automated driving systems are likely to achieve better safety outcomes, e.g., by reliably recognizing and avoiding critical situations better than humans; making better decisions, obeying traffic laws, and predicting future events better than humans; and reliably controlling a vehicle better than a human.

Referring to FIG. 1, an AV system 120 operates the AV 100 along a trajectory 198 through an environment 190 to a destination 199 (sometimes referred to as a final location) while avoiding objects (e.g., natural obstructions 191, vehicles 193, pedestrians 192, cyclists, and other obstacles) and obeying rules of the road (e.g., rules of operation or driving preferences).

In an embodiment, the AV system 120 includes devices 101 that are instrumented to receive and act on operational commands from the computer processors 146. We use the term "operational command" to mean an executable instruction (or set of instructions) that causes a vehicle to perform an action (e.g., a driving maneuver). Operational commands can, without limitation, including instructions for a vehicle to start moving forward, stop moving forward, start moving backward, stop moving backward, accelerate, decelerate, perform a left turn, and perform a right turn. In an embodiment, computing processors 146 are similar to the processor 304 described below in reference to FIG. 3. Examples of devices 101 include a steering control 102, brakes 103, gears, accelerator pedal or other acceleration control mechanisms, windshield wipers, side-door locks, window controls, and turn-indicators.

In an embodiment, the AV system 120 includes sensors 121 for measuring or inferring properties of state or condition of the AV 100, such as the AV's position, linear and angular velocity and acceleration, and heading (e.g., an orientation of the leading end of AV 100). Example of sensors 121 are GPS, inertial measurement units (IMU) that measure both vehicle linear accelerations and angular rates, wheel speed sensors for measuring or estimating wheel slip ratios, wheel brake pressure or braking torque sensors, engine torque or wheel torque sensors, and steering angle and angular rate sensors.

In an embodiment, the sensors 121 also include sensors for sensing or measuring properties of the AV's environment. For example, monocular or stereo video cameras 122 in the visible light, infrared or thermal (or both) spectra, LiDAR 123, RADAR, ultrasonic sensors, time-of-flight (TOF) depth sensors, speed sensors, temperature sensors, humidity sensors, and precipitation sensors.

In an embodiment, the AV system 120 includes a data storage unit 142 and memory 144 for storing machine instructions associated with computer processors 146 or data collected by sensors 121. In an embodiment, the data storage unit 142 is similar to the ROM 308 or storage device 310 described below in relation to FIG. 3. In an embodiment, memory 144 is similar to the main memory 306 described below. In an embodiment, the data storage unit 142 and memory 144 store historical, real-time, and/or predictive information about the environment 190. In an embodiment, the stored information includes maps, driving performance, traffic congestion updates or weather conditions. In an embodiment, data relating to the environment 190 is transmitted to the AV 100 via a communications channel from a remotely located database 134.

In an embodiment, the AV system 120 includes communications devices 140 for communicating measured or inferred properties of other vehicles' states and conditions, such as positions, linear and angular velocities, linear and angular accelerations, and linear and angular headings to the AV 100. These devices include Vehicle-to-Vehicle (V2V) and Vehicle-to-Infrastructure (V2I) communication devices and devices for wireless communications over point-to-point or ad hoc networks or both. In an embodiment, the communications devices 140 communicate across the electromagnetic spectrum (including radio and optical communications) or other media (e.g., air and acoustic media). A combination of Vehicle-to-Vehicle (V2V) Vehicle-to-Infrastructure (V2I) communication (and, in some embodiments, one or more other types of communication) is sometimes referred to as Vehicle-to-Everything (V2X) communication. V2X communication typically conforms to one or more communications standards for communication with, between, and among AVs.

In an embodiment, the communication devices 140 include communication interfaces. For example, wired, wireless, WiMAX, Wi-Fi, Bluetooth, satellite, cellular, optical, near field, infrared, or radio interfaces. The communication interfaces transmit data from a remotely located database 134 to AV system 120. In an embodiment, the remotely located database 134 is embedded in a cloud computing environment 200 as described in FIG. 2. The communication interfaces 140 transmit data collected from sensors 121 or other data related to the operation of AV 100 to the remotely located database 134. In an embodiment, communication interfaces 140 transmit information that relates to teleoperations to the AV 100. In some embodiments, the AV 100 communicates with other remote (e.g., "cloud") servers 136.

In an embodiment, the remotely located database 134 also stores and transmits digital data (e.g., storing data such as road and street locations). Such data is stored on the memory 144 on the AV 100, or transmitted to the AV 100 via a communications channel from the remotely located database 134.

In an embodiment, the remotely located database 134 stores and transmits historical information about driving properties (e.g., speed and acceleration profiles) of vehicles that have previously traveled along trajectory 198 at similar times of day. In one implementation, such data may be stored on the memory 144 on the AV 100, or transmitted to the AV 100 via a communications channel from the remotely located database 134.

Computing devices 146 located on the AV 100 algorithmically generate control actions based on both real-time sensor data and prior information, allowing the AV system 120 to execute its autonomous driving capabilities.

In an embodiment, the AV system 120 includes computer peripherals 132 coupled to computing devices 146 for providing information and alerts to, and receiving input from, a user (e.g., an occupant or a remote user) of the AV 100. In an embodiment, peripherals 132 are similar to the display 312, input device 314, and cursor controller 316 discussed below in reference to FIG. 3. The coupling is wireless or wired. Any two or more of the interface devices may be integrated into a single device.

In an embodiment, the AV system 120 receives and enforces a privacy level of a passenger, e.g., specified by the passenger or stored in a profile associated with the passenger. The privacy level of the passenger determines how particular information associated with the passenger (e.g., passenger comfort data, biometric data, etc.) is permitted to be used, stored in the passenger profile, and/or stored on the cloud server 136 and associated with the passenger profile. In an embodiment, the privacy level specifies particular information associated with a passenger that is deleted once the ride is completed. In an embodiment, the privacy level specifies particular information associated with a passenger and identifies one or more entities that are authorized to access the information. Examples of specified entities that are authorized to access information can include other AVs, third party AV systems, or any entity that could potentially access the information.

A privacy level of a passenger can be specified at one or more levels of granularity. In an embodiment, a privacy level identifies specific information to be stored or shared. In an embodiment, the privacy level applies to all the information associated with the passenger such that the passenger can specify that none of her personal information is stored or shared. Specification of the entities that are permitted to access particular information can also be specified at various levels of granularity. Various sets of entities that are permitted to access particular information can include, for example, other AVs, cloud servers 136, specific third party AV systems, etc.

In an embodiment, the AV system 120 or the cloud server 136 determines if certain information associated with a passenger can be accessed by the AV 100 or another entity. For example, a third-party AV system that attempts to access passenger input related to a particular spatiotemporal location must obtain authorization, e.g., from the AV system 120 or the cloud server 136, to access the information associated with the passenger. For example, the AV system 120 uses the passenger's specified privacy level to determine whether the passenger input related to the spatiotemporal location can be presented to the third-party AV system, the AV 100, or to another AV. This enables the passenger's privacy level to specify which other entities are allowed to receive data about the passenger's actions or other data associated with the passenger.

Figure 2:
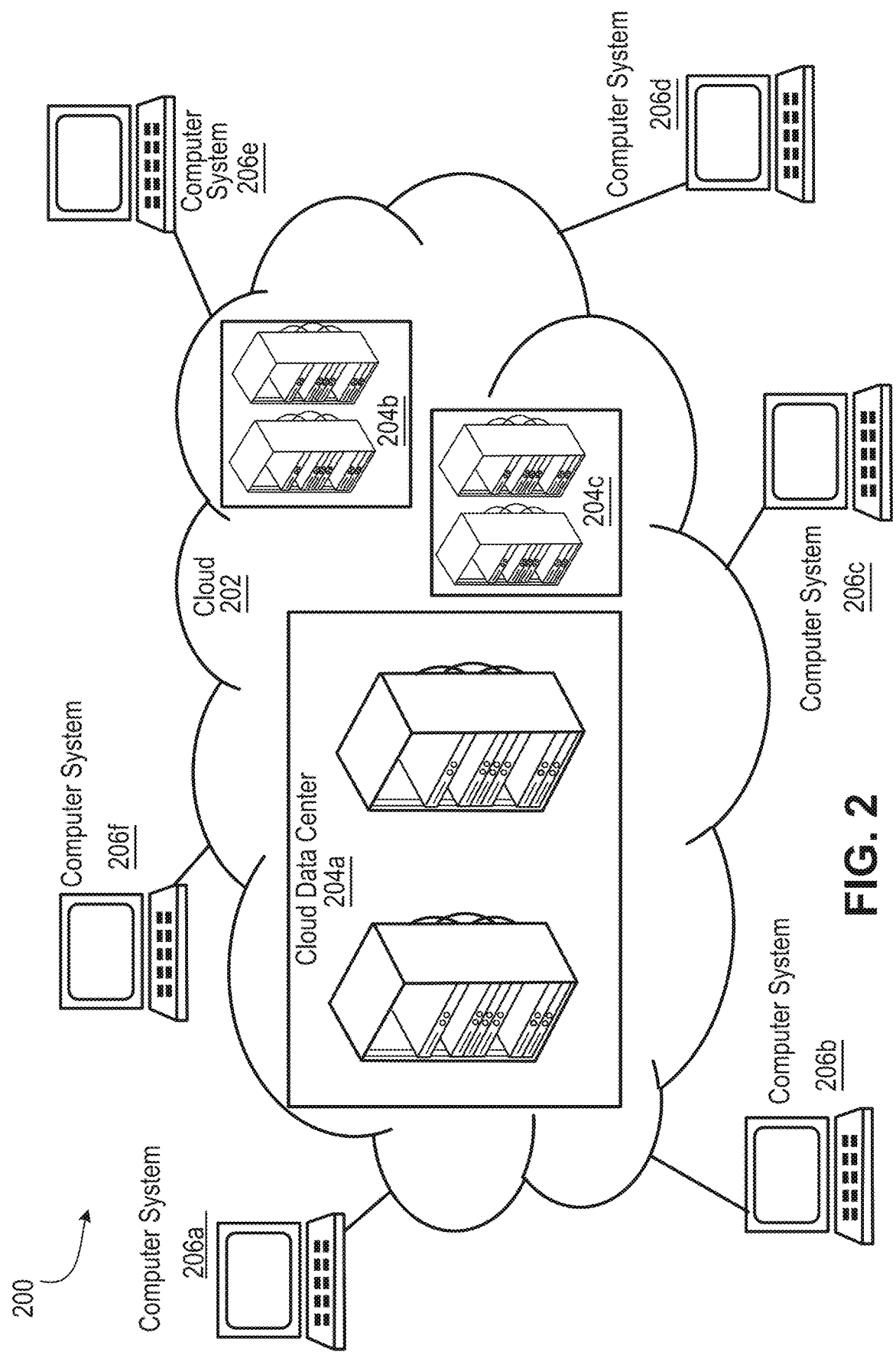
FIG. 2 illustrates an example "cloud" computing environment.

FIG. 2 illustrates an example "cloud" computing environment. Cloud computing is a model of service delivery for enabling convenient, on-demand network access to a shared pool of configurable computing resources (e.g. networks, network bandwidth, servers, processing, memory, storage, applications, virtual machines, and services). In typical cloud computing systems, one or more large cloud data centers house the machines used to deliver the services provided by the cloud. Referring now to FIG. 2, the cloud computing environment 200 includes cloud data centers 204*a*, 204*b*, and 204*c* that are interconnected through the cloud 202. Data centers 204*a*, 204*b*, and 204*c* provide cloud computing services to computer systems 206*a*, 206*b*, 206*c*, 206*d*, 206*e*, and 206*f* connected to cloud 202.

The cloud computing environment 200 includes one or more cloud data centers. In general, a cloud data center, for example the cloud data center 204*a* shown in FIG. 2, refers to the physical arrangement of servers that make up a cloud, for example the cloud 202 shown in FIG. 2, or a particular portion of a cloud. For example, servers are physically arranged in the cloud datacenter into rooms, groups, rows, and racks. A cloud datacenter has one or more zones, which include one or more rooms of servers. Each room has one or more rows of servers, and each row includes one or more racks. Each rack includes one or more individual server nodes. In some implementation, servers in zones, rooms, racks, and/or rows are arranged into groups based on physical infrastructure requirements of the datacenter facility, which include power, energy, thermal, heat, and/or other requirements. In an embodiment, the server nodes are similar to the computer system described in FIG. 3. The data center 204*a* has many computing systems distributed through many racks.

The cloud 202 includes cloud data centers 204*a*, 204*b*, and 204*c* along with the network and networking resources (for example, networking equipment, nodes, routers, switches, and networking cables) that interconnect the cloud data centers 204*a*, 204*b*, and 204*c* and help facilitate the computing systems' 206*a-f* access to cloud computing services. In an embodiment, the network represents any combination of one or more local networks, wide area networks, or internetworks coupled using wired or wireless links deployed using terrestrial or satellite connections. Data exchanged over the network, is transferred using any number of network layer protocols, such as Internet Protocol (IP), Multiprotocol Label Switching (MPLS), Asynchronous Transfer Mode (ATM), Frame Relay, etc. Furthermore, in embodiments where the network represents a combination of multiple sub-networks, different network layer protocols are used at each of the underlying sub-networks. In some embodiments, the network represents one or more interconnected internetworks, such as the public Internet.

The computing systems 206a-f or cloud computing services consumers are connected to the cloud 202 through network links and network adapters. In an embodiment, the computing systems 206a-f are implemented as various computing devices, for example servers, desktops, laptops, tablet, smartphones, Internet of Things (IoT) devices, autonomous vehicles (including, cars, drones, shuttles, trains, buses, etc.) and consumer electronics. In an embodiment, the computing systems 206a-f are implemented in or as a part of other systems.

Figure 3:
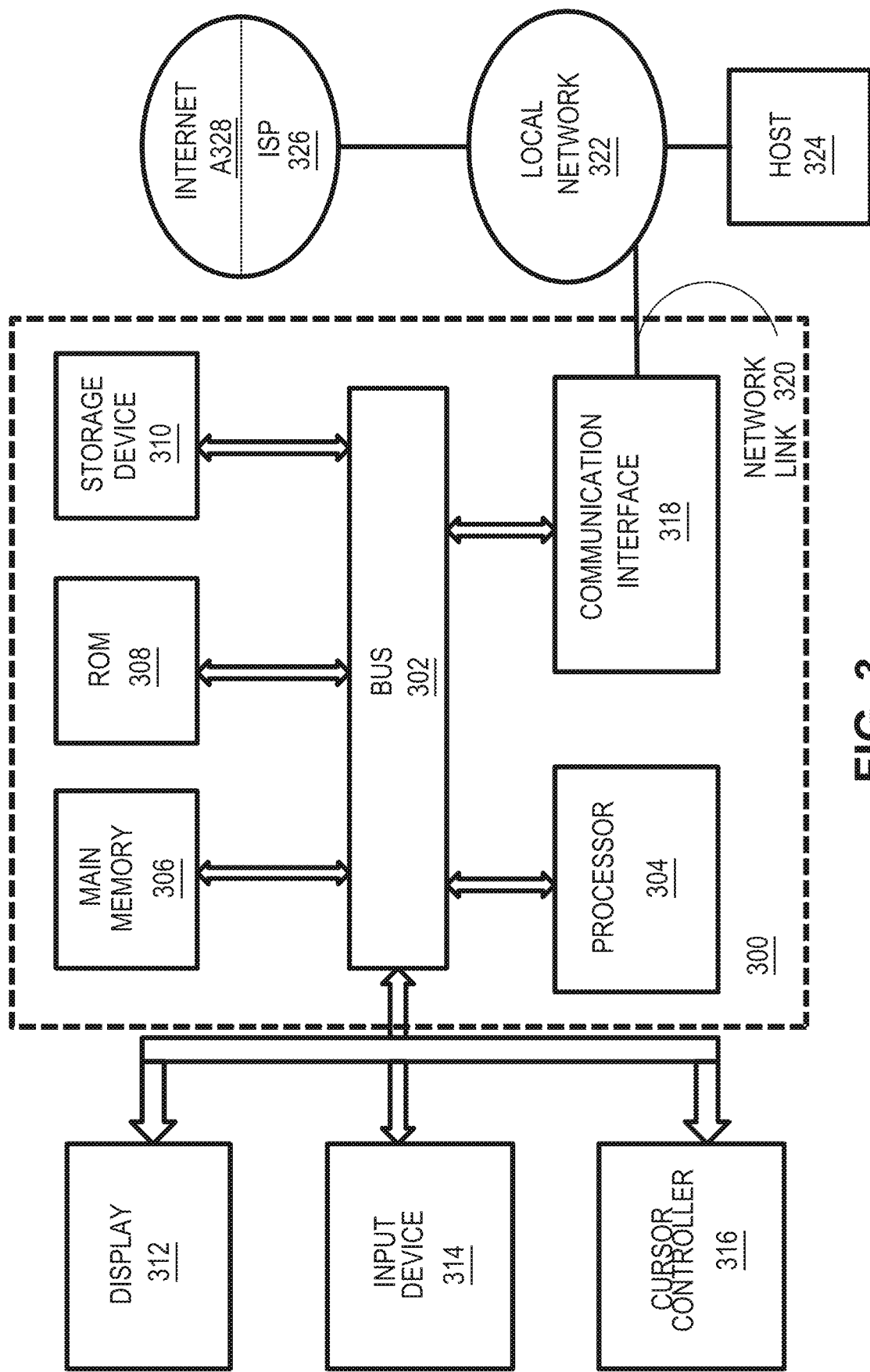
FIG. 3 illustrates a computer system.

FIG. 3 illustrates a computer system 300. In an implementation, the computer system 300 is a special purpose computing device. The special-purpose computing device is hard-wired to perform the techniques or includes digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. In various embodiments, the special-purpose computing devices are desktop computer systems, portable computer systems, handheld devices, network devices or any other device that incorporates hard-wired and/or program logic to implement the techniques.

In an embodiment, the computer system 300 includes a bus 302 or other communication mechanism for communicating information, and a hardware processor 304 coupled with a bus 302 for processing information. The hardware processor 304 is, for example, a general-purpose microprocessor. The computer system 300 also includes a main memory 306, such as a random-access memory (RAM) or other dynamic storage device, coupled to the bus 302 for storing information and instructions to be executed by processor 304. In one implementation, the main memory 306 is used for storing temporary variables or other intermediate information during execution of instructions to be executed by the processor 304. Such instructions, when stored in non-transitory storage media accessible to the processor 304, render the computer system 300 into a special-purpose machine that is customized to perform the operations specified in the instructions.

In an embodiment, the computer system 300 further includes a read only memory (ROM) 308 or other static storage device coupled to the bus 302 for storing static information and instructions for the processor 304. A storage device 310, such as a magnetic disk, optical disk, solid-state drive, or three-dimensional cross point memory is provided and coupled to the bus 302 for storing information and instructions.

In an embodiment, the computer system 300 is coupled via the bus 302 to a display 312, such as a cathode ray tube (CRT), a liquid crystal display (LCD), plasma display, light emitting diode (LED) display, or an organic light emitting diode (OLED) display for displaying information to a computer user. An input device 314, including alphanumeric and other keys, is coupled to bus 302 for communicating information and command selections to the processor 304. Another type of user input device is a cursor controller 316, such as a mouse, a trackball, a touch-enabled display, or cursor direction keys for communicating direction information and command selections to the processor 304 and for controlling cursor movement on the display 312. This input device typically has two degrees of freedom in two axes, a first axis (e.g., x-axis) and a second axis (e.g., y-axis), that allows the device to specify positions in a plane.

According to one embodiment, the techniques herein are performed by the computer system 300 in response to the processor 304 executing one or more sequences of one or more instructions contained in the main memory 306. Such instructions are read into the main memory 306 from another storage medium, such as the storage device 310. Execution of the sequences of instructions contained in the main memory 306 causes the processor 304 to perform the process steps described herein. In alternative embodiments, hard-wired circuitry is used in place of or in combination with software instructions.

The term "storage media" as used herein refers to any non-transitory media that store data and/or instructions that cause a machine to operate in a specific fashion. Such storage media includes non-volatile media and/or volatile media. Non-volatile media includes, for example, optical disks, magnetic disks, solid-state drives, or three-dimensional cross point memory, such as the storage device 310. Volatile media includes dynamic memory, such as the main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NV-RAM, or any other memory chip or cartridge.

Storage media is distinct from but may be used in conjunction with transmission media. Transmission media participates in transferring information between storage media. For example, transmission media includes coaxial cables, copper wire and fiber optics, including the wires that comprise the bus 302. Transmission media can also take the form of acoustic or light waves, such as those generated during radio-wave and infrared data communications.

In an embodiment, various forms of media are involved in carrying one or more sequences of one or more instructions to the processor 304 for execution. For example, the instructions are initially carried on a magnetic disk or solid-state drive of a remote computer. The remote computer loads the instructions into its dynamic memory and send the instructions over a telephone line using a modem. A modem local to the computer system 300 receives the data on the telephone line and use an infrared transmitter to convert the data to an infrared signal. An infrared detector receives the data carried in the infrared signal and appropriate circuitry places the data on the bus 302. The bus 302 carries the data to the main memory 306, from which processor 304 retrieves and executes the instructions. The instructions received by the main memory 306 may optionally be stored on the storage device 310 either before or after execution by processor 304.

The computer system 300 also includes a communication interface 318 coupled to the bus 302. The communication interface 318 provides a two-way data communication coupling to a network link 320 that is connected to a local network 322. For example, the communication interface 318 is an integrated service digital network (ISDN) card, cable modem, satellite modem, or a modem to provide a data communication connection to a corresponding type of telephone line. As another example, the communication interface 318 is a local area network (LAN) card to provide a data communication connection to a compatible LAN. In some implementations, wireless links are also implemented. In any such implementation, the communication interface 318 sends and receives electrical, electromagnetic, or optical signals that carry digital data streams representing various types of information.

The network link 320 typically provides data communication through one or more networks to other data devices. For example, the network link 320 provides a connection through the local network 322 to a host computer 324 or to a cloud data center or equipment operated by an Internet Service Provider (ISP) 326. The ISP 326 in turn provides data communication services through the world-wide packet data communication network now commonly referred to as the "Internet" 328. The local network 322 and Internet 328 both use electrical, electromagnetic or optical signals that carry digital data streams. The signals through the various networks and the signals on the network link 320 and through the communication interface 318, which carry the digital data to and from the computer system 300, are example forms of transmission media. In an embodiment, the network 320 contains the cloud 202 or a part of the cloud 202 described above.

The computer system 300 sends messages and receives data, including program code, through the network(s), the network link 320, and the communication interface 318. In an embodiment, the computer system 300 receives code for processing. The received code is executed by the processor 304 as it is received, and/or stored in storage device 310, or other non-volatile storage for later execution.

Autonomous Vehicle Architecture

Figure 4:
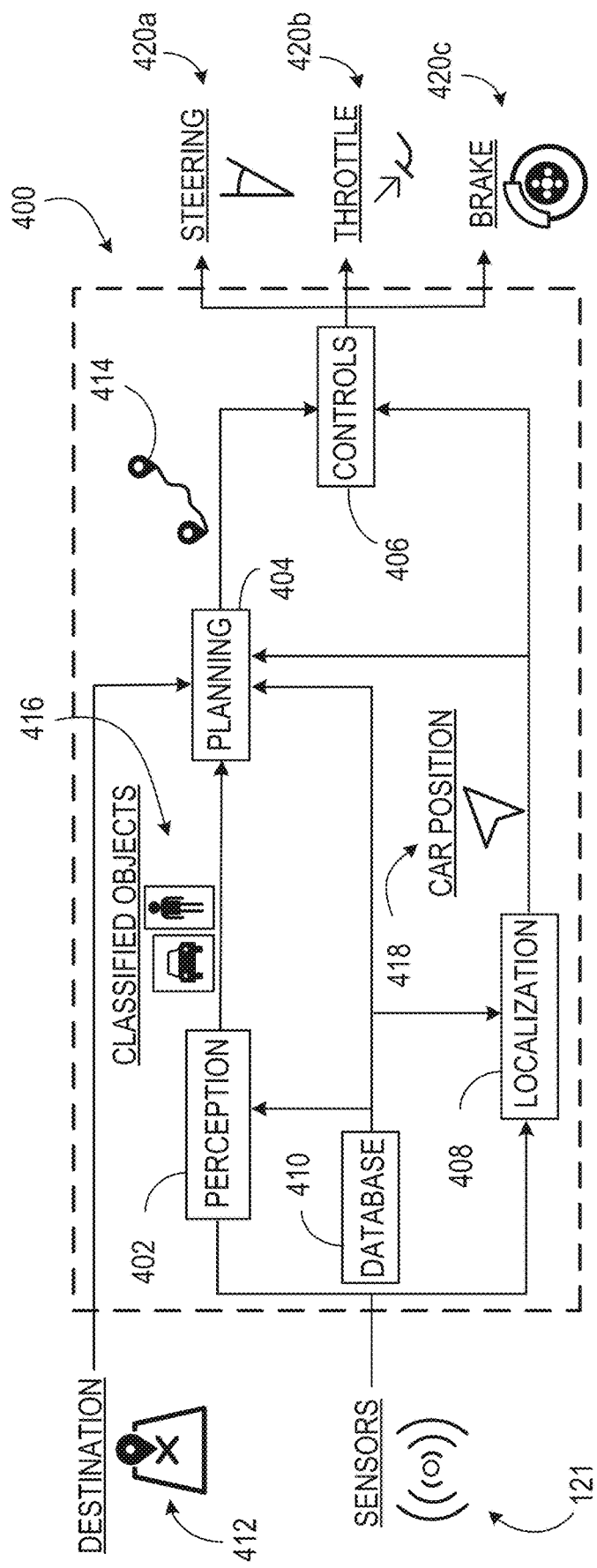
FIG. 4 shows an example architecture for an AV.

FIG. 4 shows an example architecture 400 for an autonomous vehicle (e.g., the AV 100 shown in FIG. 1). The architecture 400 includes a perception module 402 (sometimes referred to as a perception circuit), a planning module 404 (sometimes referred to as a planning circuit), a control module 406 (sometimes referred to as a control circuit), a localization module 408 (sometimes referred to as a localization circuit), and a database module 410 (sometimes referred to as a database circuit). Each module plays a role in the operation of the AV 100. Together, the modules 402, 404, 406, 408, and 410 may be part of the AV system 120 shown in FIG. 1. In some embodiments, any of the modules 402, 404, 406, 408, and 410 is a combination of computer software (e.g., executable code stored on a computer-readable medium) and computer hardware (e.g., one or more microprocessors, microcontrollers, application-specific integrated circuits [ASICs]), hardware memory devices, other types of integrated circuits, other types of computer hardware, or a combination of any or all of these things). Each of the modules 402, 404, 406, 408, and 410 is sometimes referred to as a processing circuit (e.g., computer hardware, computer software, or a combination of the two). A combination of any or all of the modules 402, 404, 406, 408, and 410 is also an example of a processing circuit.

In use, the planning module 404 receives data representing a destination 412 and determines data representing a trajectory 414 (sometimes referred to as a route) that can be traveled by the AV 100 to reach (e.g., arrive at) the destination 412. In order for the planning module 404 to determine the data representing the trajectory 414, the planning module 404 receives data from the perception module 402, the localization module 408, and the database module 410.

The perception module 402 identifies nearby physical objects using one or more sensors 121, e.g., as also shown in FIG. 1. The objects are classified (e.g., grouped into types such as pedestrian, bicycle, automobile, traffic sign, etc.) and a scene description including the classified objects 416 is provided to the planning module 404.

The planning module 404 also receives data representing the AV position 418 from the localization module 408. The localization module 408 determines the AV position by using data from the sensors 121 and data from the database module 410 (e.g., a geographic data) to calculate a position. For example, the localization module 408 uses data from a GNSS (Global Navigation Satellite System) sensor and geographic data to calculate a longitude and latitude of the AV. In an embodiment, data used by the localization module 408 includes high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations of them), and maps describing the spatial locations of road features such as crosswalks, traffic signs or other travel signals of various types. In an embodiment, the high-precision maps are constructed by adding data through automatic or manual annotation to low-precision maps.

The control module 406 receives the data representing the trajectory 414 and the data representing the AV position 418 and operates the control functions 420a-c (e.g., steering, throttling, braking, ignition) of the AV in a manner that will cause the AV 100 to travel the trajectory 414 to the destination 412. For example, if the trajectory 414 includes a left turn, the control module 406 will operate the control functions 420a-c in a manner such that the steering angle of the steering function will cause the AV 100 to turn left and the throttling and braking will cause the AV 100 to pause and wait for passing pedestrians or vehicles before the turn is made.

Autonomous Vehicle Inputs

Figure 5:
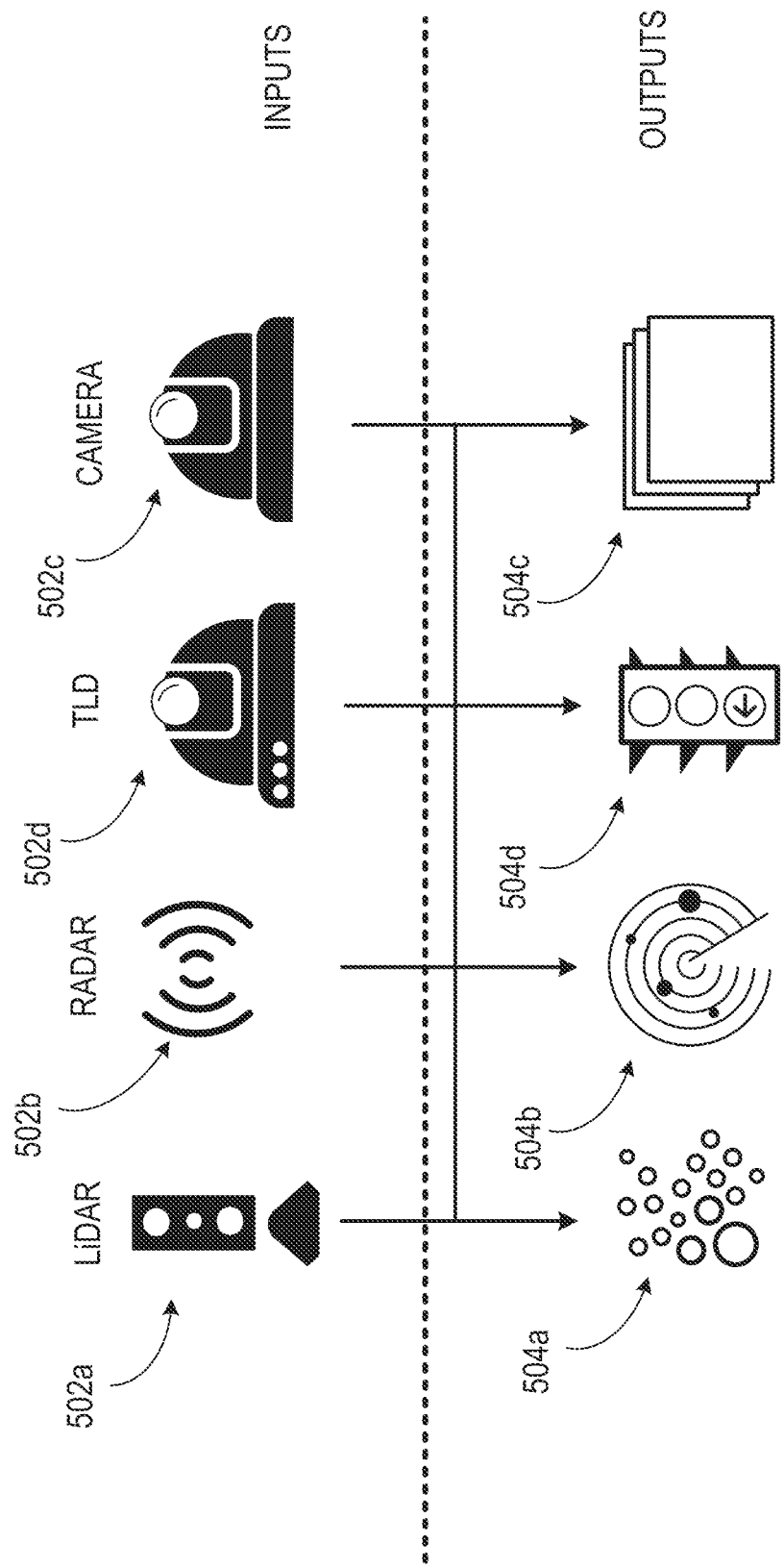
FIG. 5 shows an example of inputs and outputs that may be used by a perception module.

FIG. 5 shows an example of inputs 502a-d (e.g., sensors 121 shown in FIG. 1) and outputs 504a-d (e.g., sensor data) that is used by the perception module 402 (FIG. 4). One input 502a is a LiDAR (Light Detection and Ranging) system (e.g., LiDAR 123 shown in FIG. 1). LiDAR is a technology that uses light (e.g., bursts of light such as infrared light) to obtain data about physical objects in its line of sight. A LiDAR system produces LiDAR data as output 504a. For example, LiDAR data is collections of 3D or 2D points (also known as a point clouds) that are used to construct a representation of the environment 190.

Another input 502b is a RADAR system. RADAR is a technology that uses radio waves to obtain data about nearby physical objects. RADARs can obtain data about objects not within the line of sight of a LiDAR system. A RADAR system 502b produces RADAR data as output 504b. For example, RADAR data are one or more radio frequency electromagnetic signals that are used to construct a representation of the environment 190.

Another input 502c is a camera system. A camera system uses one or more cameras (e.g., digital cameras using a light sensor such as a charge-coupled device [CCD]) to obtain information about nearby physical objects. A camera system produces camera data as output 504c. Camera data often takes the form of image data (e.g., data in an image data format such as RAW, JPEG, PNG, etc.). In some examples, the camera system has multiple independent cameras, e.g., for the purpose of stereopsis (stereo vision), which enables the camera system to perceive depth. Although the objects perceived by the camera system are described here as "nearby," this is relative to the AV. In use, the camera system may be configured to "see" objects far, e.g., up to a kilometer or more ahead of the AV. Accordingly, the camera system may have features such as sensors and lenses that are optimized for perceiving objects that are far away.

Another input 502d is a traffic light detection (TLD) system. A TLD system uses one or more cameras to obtain information about traffic lights, street signs, and other physical objects that provide visual navigation information. A TLD system produces TLD data as output 504d. TLD data often takes the form of image data (e.g., data in an image data format such as RAW, JPEG, PNG, etc.). A TLD system differs from a system incorporating a camera in that a TLD system uses a camera with a wide field of view (e.g., using a wide-angle lens or a fish-eye lens) in order to obtain information about as many physical objects providing visual navigation information as possible, so that the AV 100 has access to all relevant navigation information provided by these objects. For example, the viewing angle of the TLD system may be about 120 degrees or more.

In some embodiments, outputs 504a-d are combined using a sensor fusion technique. Thus, either the individual outputs 504a-d are provided to other systems of the AV 100 (e.g., provided to a planning module 404 as shown in FIG. 4), or the combined output can be provided to the other systems, either in the form of a single combined output or multiple combined outputs of the same type (e.g., using the same combination technique or combining the same outputs or both) or different types type (e.g., using different respective combination techniques or combining different respective outputs or both). In some embodiments, an early fusion technique is used. An early fusion technique is characterized by combining outputs before one or more data processing steps are applied to the combined output. In some embodiments, a late fusion technique is used. A late fusion technique is characterized by combining outputs after one or more data processing steps are applied to the individual outputs.

Figure 6:
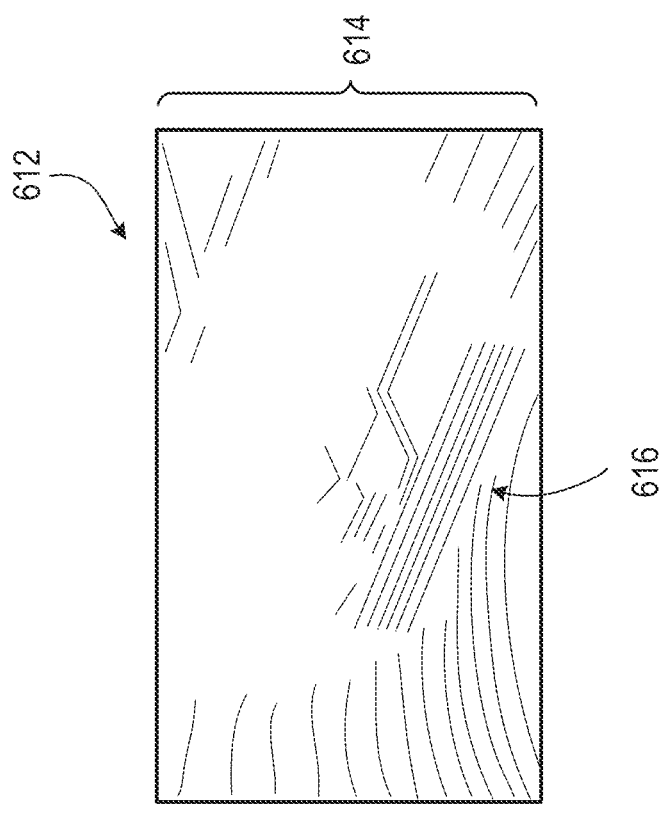
FIG. 6 shows an example of a LiDAR system.

FIG. 6 shows an example of a LiDAR system 602 (e.g., the input 502a shown in FIG. 5). The LiDAR system 602 emits light 604a-c from a light emitter 606 (e.g., a laser transmitter). Light emitted by a LiDAR system is typically not in the visible spectrum; for example, infrared light is often used. Some of the light 604b emitted encounters a physical object 608 (e.g., a vehicle) and reflects back to the LiDAR system 602. (Light emitted from a LiDAR system typically does not penetrate physical objects, e.g., physical objects in solid form.) The LiDAR system 602 also has one or more light detectors 610, which detect the reflected light. In an embodiment, one or more data processing systems associated with the LiDAR system generates an image 612 representing the field of view 614 of the LiDAR system. The image 612 includes information that represents the boundaries 616 of a physical object 608. In this way, the image 612 is used to determine the boundaries 616 of one or more physical objects near an AV.

Figure 7:
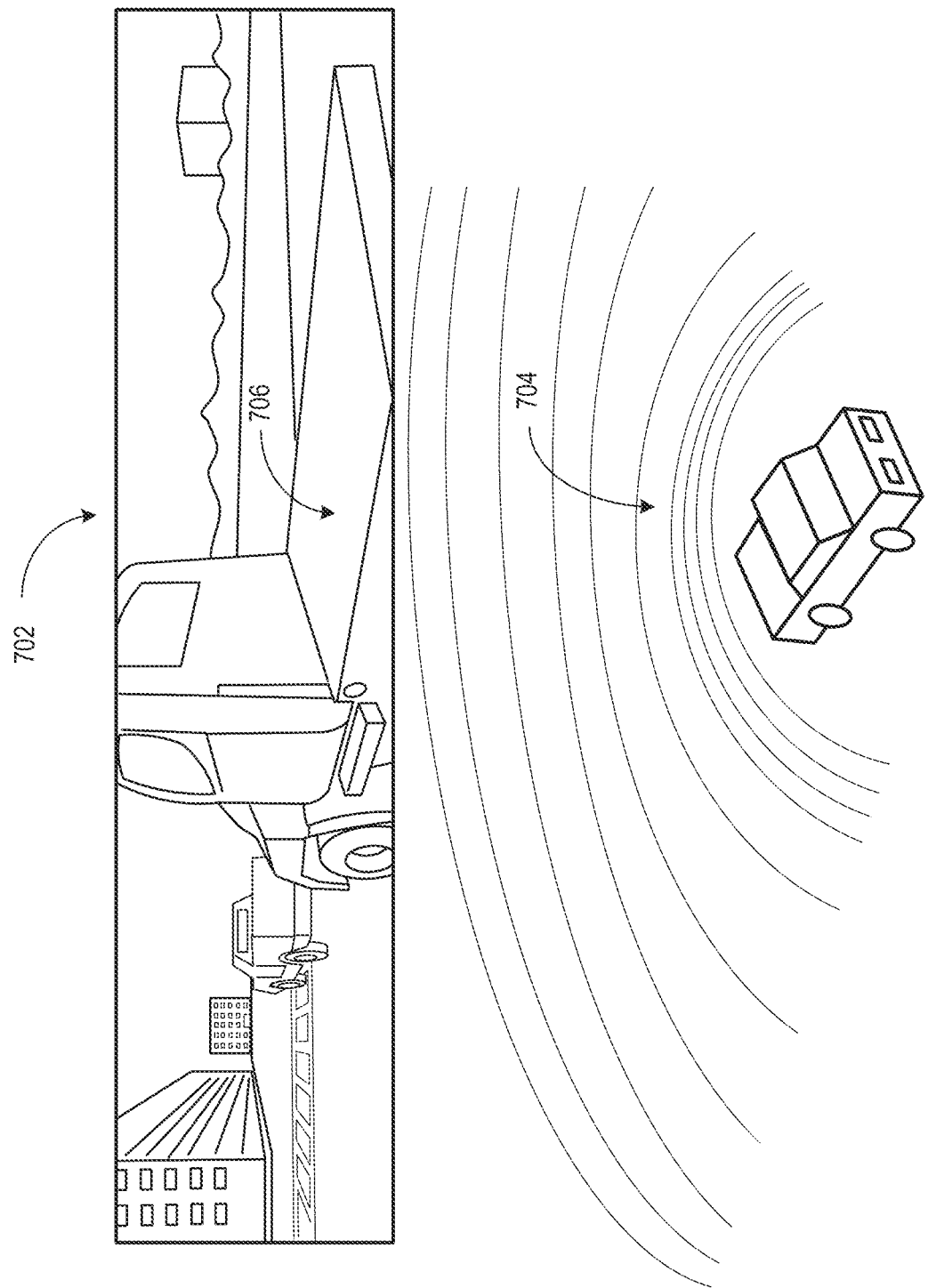
FIG. 7 shows the LiDAR system in operation.

FIG. 7 shows the LiDAR system 602 in operation. In the scenario shown in this figure, the AV 100 receives both camera system output 504c in the form of an image 702 and LiDAR system output 504a in the form of LiDAR data points 704. In use, the data processing systems of the AV 100 compares the image 702 to the data points 704. In particular, a physical object 706 identified in the image 702 is also identified among the data points 704. In this way, the AV 100 perceives the boundaries of the physical object based on the contour and density of the data points 704.

Figure 8:
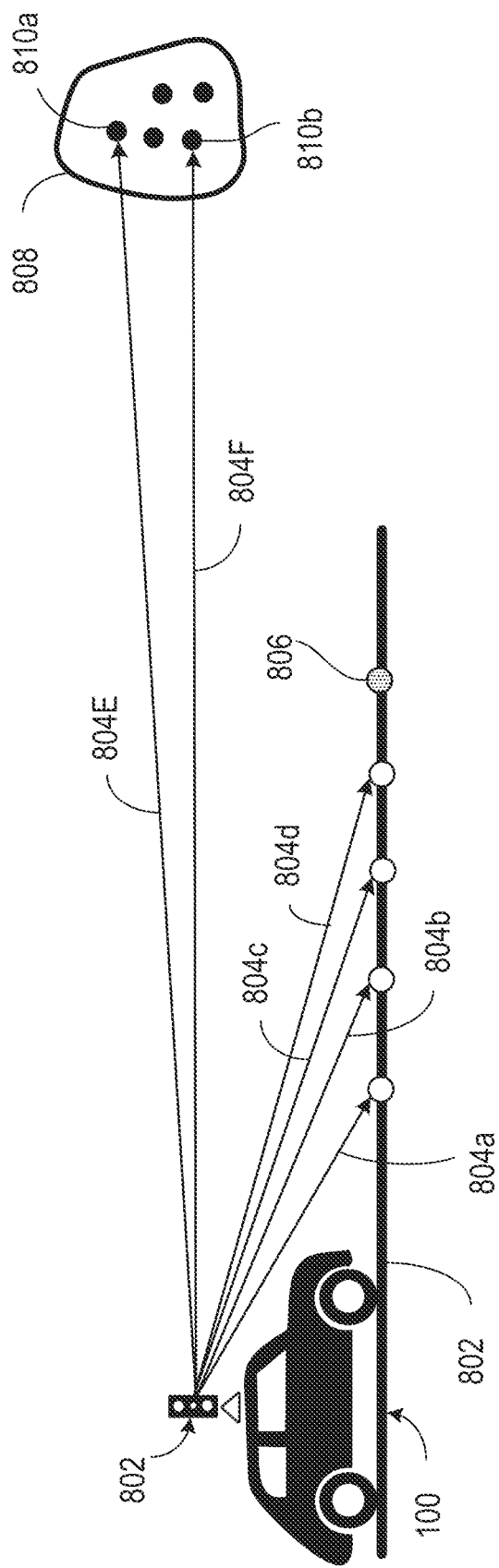
FIG. 8 shows the operation of the LiDAR system in additional detail.

FIG. 8 shows the operation of the LiDAR system 602 in additional detail. As described above, the AV 100 detects the boundary of a physical object based on characteristics of the data points detected by the LiDAR system 602. As shown in FIG. 8, a flat object, such as the ground 802, will reflect light 804a-d emitted from a LiDAR system 602 in a consistent manner. Put another way, because the LiDAR system 602 emits light using consistent spacing, the ground 802 will reflect light back to the LiDAR system 602 with the same consistent spacing. As the AV 100 travels over the ground 802, the LiDAR system 602 will continue to detect light reflected by the next valid ground point 806 if nothing is obstructing the road. However, if an object 808 obstructs the road, light 804e-f emitted by the LiDAR system 602 will be reflected from points 810a-b in a manner inconsistent with the expected consistent manner. From this information, the AV 100 can determine that the object 808 is present.

Path Planning

Figure 9:
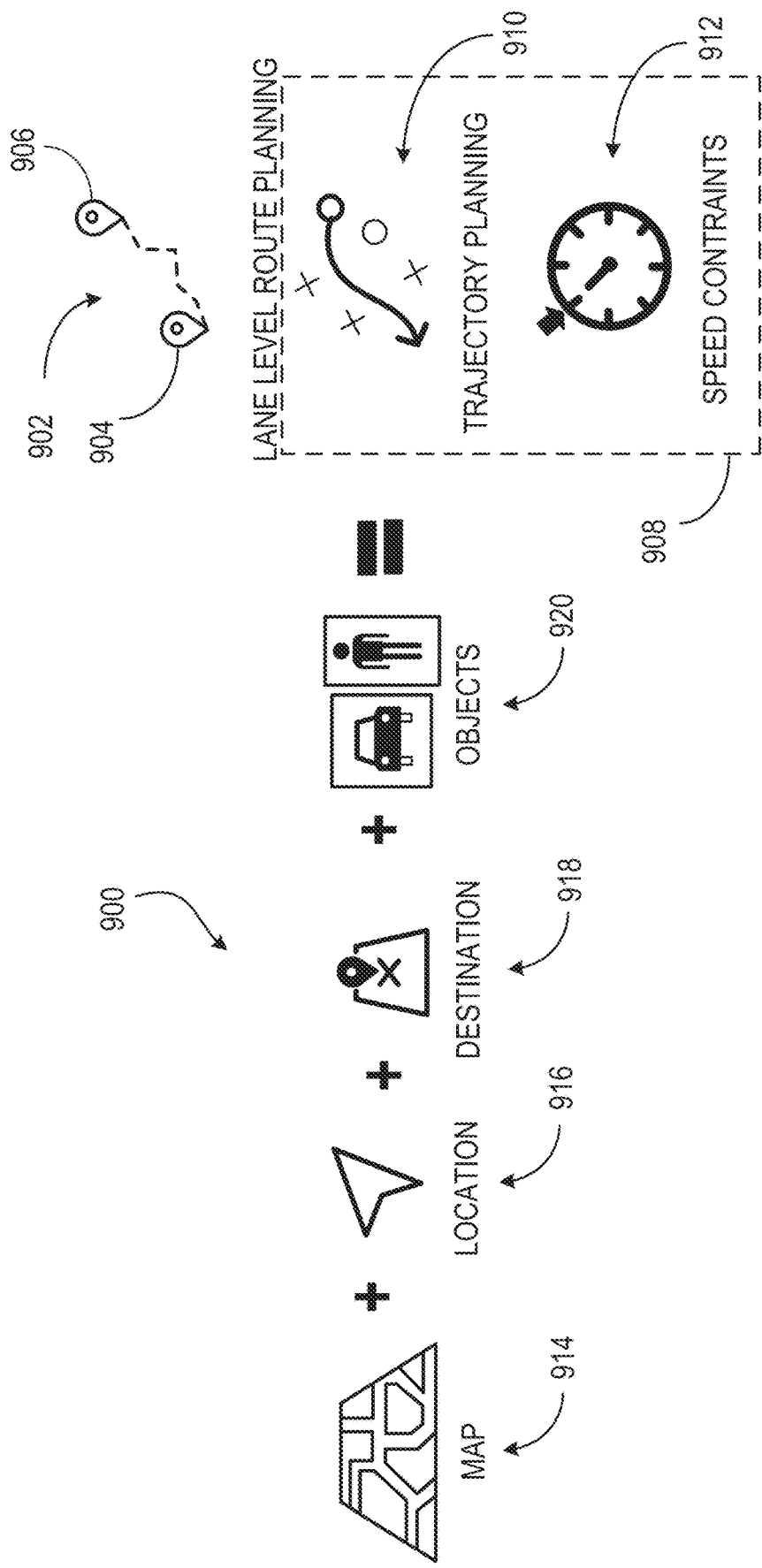
FIG. 9 shows a block diagram of the relationships between inputs and outputs of a planning module.

FIG. 9 shows a block diagram 900 of the relationships between inputs and outputs of a planning module 404 (e.g., as shown in FIG. 4). In general, the output of a planning module 404 is a route 902 from a start point 904 (e.g., source location or initial location), and an end point 906 (e.g., destination or final location). The route 902 is typically defined by one or more segments. For example, a segment is a distance to be traveled over at least a portion of a street, road, highway, driveway, or other physical area appropriate for automobile travel. In some examples, e.g., if the AV 100 is an off-road capable vehicle such as a four-wheel-drive (4WD) or all-wheel-drive (AWD) car, SUV, pick-up truck, or the like, the route 902 includes "off-road" segments such as unpaved paths or open fields.

In addition to the route 902, a planning module also outputs lane-level route planning data 908. The lane-level route planning data 908 is used to traverse segments of the route 902 based on conditions of the segment at a particular time. For example, if the route 902 includes a multi-lane highway, the lane-level route planning data 908 includes trajectory planning data 910 that the AV 100 can use to choose a lane among the multiple lanes, e.g., based on whether an exit is approaching, whether one or more of the lanes have other vehicles, or other factors that vary over the course of a few minutes or less. Similarly, in some implementations, the lane-level route planning data 908 includes speed constraints 912 specific to a segment of the route 902. For example, if the segment includes pedestrians or unexpected traffic, the speed constraints 912 may limit the AV 100 to a travel speed slower than an expected speed, e.g., a speed based on speed limit data for the segment.

In an embodiment, the inputs to the planning module 404 includes database data 914 (e.g., from the database module 410 shown in FIG. 4), current location data 916 (e.g., the AV position 418 shown in FIG. 4), destination data 918 (e.g., for the destination 412 shown in FIG. 4), and object data 920 (e.g., the classified objects 416 as perceived by the perception module 402 as shown in FIG. 4). In some embodiments, the database data 914 includes rules used in planning. Rules are specified using a formal language, e.g., using Boolean logic. In any given situation encountered by the AV 100, at least some of the rules will apply to the situation. A rule applies to a given situation if the rule has conditions that are met based on information available to the AV 100, e.g., information about the surrounding environment. Rules can have priority. For example, a rule that says, "if the road is a freeway, move to the leftmost lane" can have a lower priority than "if the exit is approaching within a mile, move to the rightmost lane."

Figure 10:
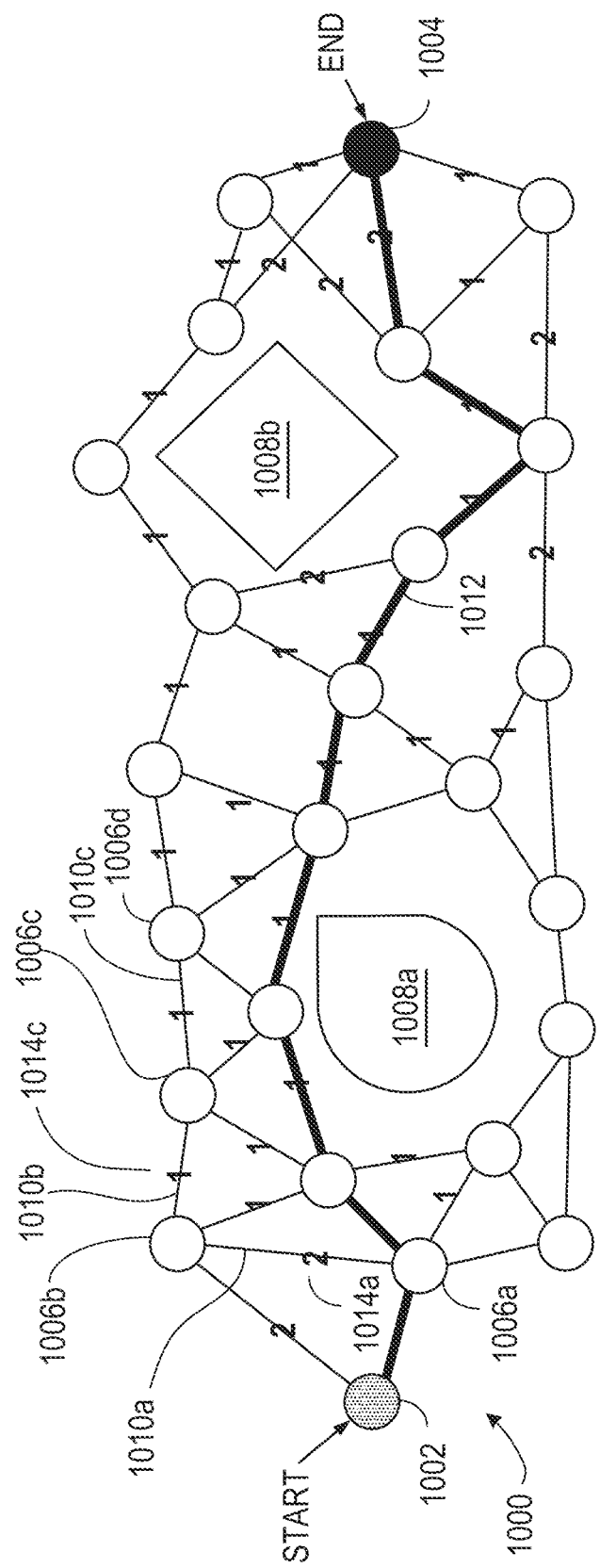
FIG. 10 shows a directed graph used in path planning.

FIG. 10 shows a directed graph 1000 used in path planning, e.g., by the planning module 404 (FIG. 4). In general, a directed graph 1000 like the one shown in FIG. 10 is used to determine a path between any start point 1002 and end point 1004. In real-world terms, the distance separating the start point 1002 and end point 1004 may be relatively large (e.g, in two different metropolitan areas) or may be relatively small (e.g., two intersections abutting a city block or two lanes of a multi-lane road).

In an embodiment, the directed graph 1000 has nodes 1006a-d representing different locations between the start point 1002 and the end point 1004 that could be occupied by an AV 100. In some examples, e.g., when the start point 1002 and end point 1004 represent different metropolitan areas, the nodes 1006a-d represent segments of roads. In some examples, e.g., when the start point 1002 and the end point 1004 represent different locations on the same road, the nodes 1006a-d represent different positions on that road. In this way, the directed graph 1000 includes information at varying levels of granularity. In an embodiment, a directed graph having high granularity is also a subgraph of another directed graph having a larger scale. For example, a directed graph in which the start point 1002 and the end point 1004 are far away (e.g., many miles apart) has most of its information at a low granularity and is based on stored data, but also includes some high granularity information for the portion of the graph that represents physical locations in the field of view of the AV 100.

The nodes 1006a-d are distinct from objects 1008a-b which cannot overlap with a node. In an embodiment, when granularity is low, the objects 1008a-b represent regions that cannot be traversed by automobile, e.g., areas that have no streets or roads. When granularity is high, the objects 1008a-b represent physical objects in the field of view of the AV 100, e.g., other automobiles, pedestrians, or other entities with which the AV 100 cannot share physical space. In an embodiment, some or all of the objects 1008a-b are a static objects (e.g., an object that does not change position such as a street lamp or utility pole) or dynamic objects (e.g., an object that is capable of changing position such as a pedestrian or other car).

The nodes 1006a-d are connected by edges 1010a-c. If two nodes 1006a-b are connected by an edge 1010a, it is possible for an AV 100 to travel between one node 1006a and the other node 1006b, e.g., without having to travel to an intermediate node before arriving at the other node 1006b. (When we refer to an AV 100 traveling between nodes, we mean that the AV 100 travels between the two physical positions represented by the respective nodes.) The edges 1010a-c are often bidirectional, in the sense that an AV 100 travels from a first node to a second node, or from the second node to the first node. In an embodiment, edges 1010a-c are unidirectional, in the sense that an AV 100 can travel from a first node to a second node, however the AV 100 cannot travel from the second node to the first node. Edges 1010a-c are unidirectional when they represent, for example, one-way streets, individual lanes of a street, road, or highway, or other features that can only be traversed in one direction due to legal or physical constraints.

In an embodiment, the planning module 404 uses the directed graph 1000 to identify a path 1012 made up of nodes and edges between the start point 1002 and end point 1004.

An edge 1010a-c has an associated cost 1014a-b. The cost 1014a-b is a value that represents the resources that will be expended if the AV 100 chooses that edge. A typical resource is time. For example, if one edge 1010a represents a physical distance that is twice that as another edge 1010b, then the associated cost 1014a of the first edge 1010a may be twice the associated cost 1014b of the second edge 1010b. Other factors that affect time include expected traffic, number of intersections, speed limit, etc. Another typical resource is fuel economy. Two edges 1010a-b may represent the same physical distance, but one edge 1010a may require more fuel than another edge 1010b, e.g., because of road conditions, expected weather, etc.

When the planning module 404 identifies a path 1012 between the start point 1002 and end point 1004, the planning module 404 typically chooses a path optimized for cost, e.g., the path that has the least total cost when the individual costs of the edges are added together.

Autonomous Vehicle Control

Figure 11:
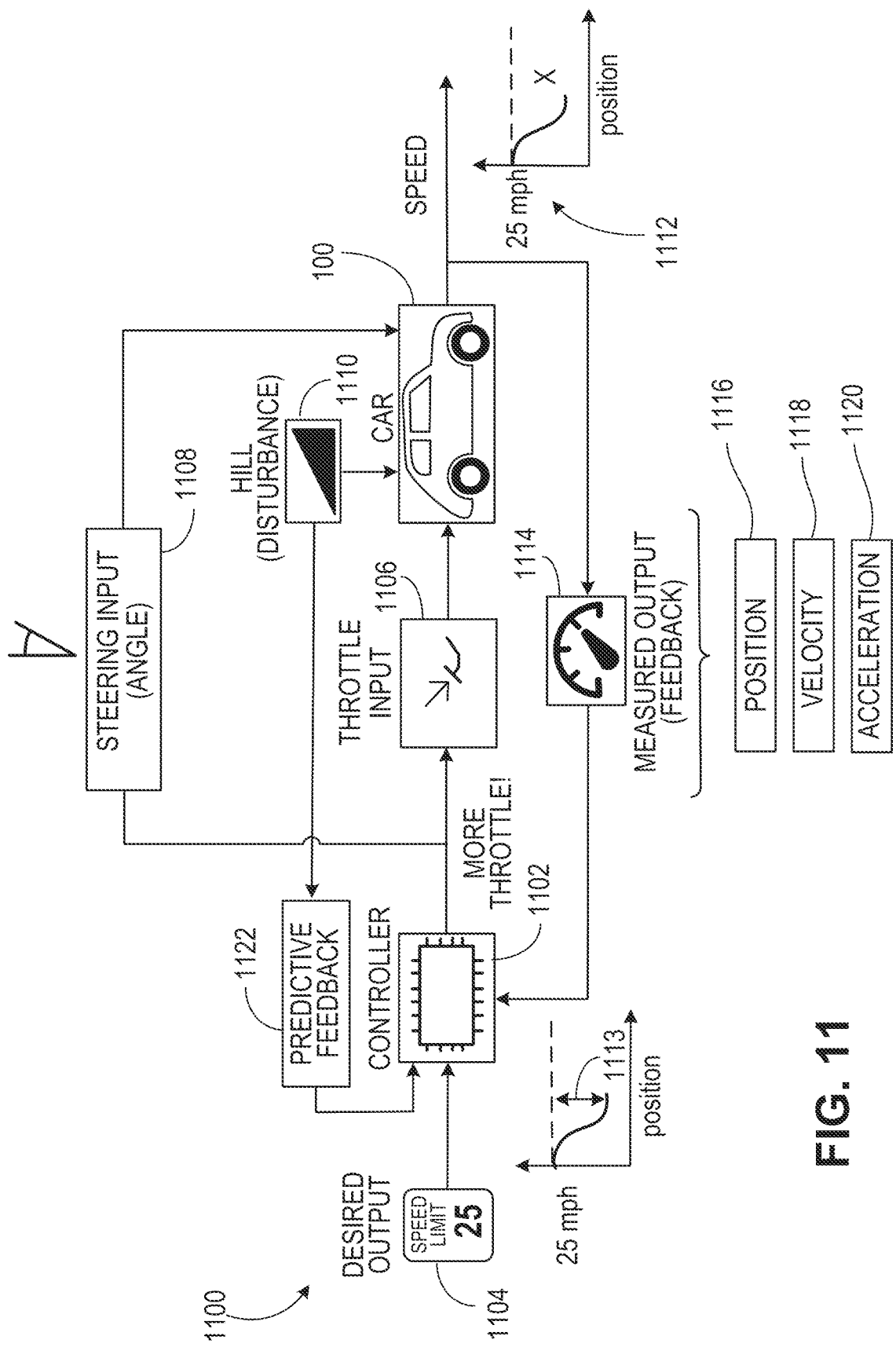
FIG. 11 shows a block diagram of the inputs and outputs of a control module.

FIG. 11 shows a block diagram 1100 of the inputs and outputs of a control module 406 (e.g., as shown in FIG. 4). A control module operates in accordance with a controller 1102 which includes, for example, one or more processors (e.g., one or more computer processors such as microprocessors or microcontrollers or both) similar to processor 304, short-term and/or long-term data storage (e.g., memory random-access memory or flash memory or both) similar to main memory 306, ROM 308, and storage device 310, and instructions stored in memory that carry out operations of the controller 1102 when the instructions are executed (e.g., by the one or more processors).

In an embodiment, the controller 1102 receives data representing a desired output 1104. The desired output 1104 typically includes a velocity, e.g., a speed and a heading. The desired output 1104 can be based on, for example, data received from a planning module 404 (e.g., as shown in FIG. 4). In accordance with the desired output 1104, the controller 1102 produces data usable as a throttle input 1106 and a steering input 1108. The throttle input 1106 represents the magnitude in which to engage the throttle (e.g., acceleration control) of an AV 100, e.g., by engaging the steering pedal, or engaging another throttle control, to achieve the desired output 1104. In some examples, the throttle input 1106 also includes data usable to engage the brake (e.g., deceleration control) of the AV 100. The steering input 1108 represents a steering angle, e.g., the angle at which the steering control (e.g., steering wheel, steering angle actuator, or other functionality for controlling steering angle) of the AV should be positioned to achieve the desired output 1104.

In an embodiment, the controller 1102 receives feedback that is used in adjusting the inputs provided to the throttle and steering. For example, if the AV 100 encounters a disturbance 1110, such as a hill, the measured speed 1112 of the AV 100 is lowered below the desired output speed. In an embodiment, any measured output 1114 is provided to the controller 1102 so that the necessary adjustments are performed, e.g., based on the differential 1113 between the measured speed and desired output. The measured output 1114 includes measured position 1116, measured velocity 1118, (including speed and heading), measured acceleration 1120, and other outputs measurable by sensors of the AV 100.

In an embodiment, information about the disturbance 1110 is detected in advance, e.g., by a sensor such as a camera or LiDAR sensor, and provided to a predictive feedback module 1122. The predictive feedback module 1122 then provides information to the controller 1102 that the controller 1102 can use to adjust accordingly. For example, if the sensors of the AV 100 detect ("see") a hill, this information can be used by the controller 1102 to prepare to engage the throttle at the appropriate time to avoid significant deceleration.

Figure 12:
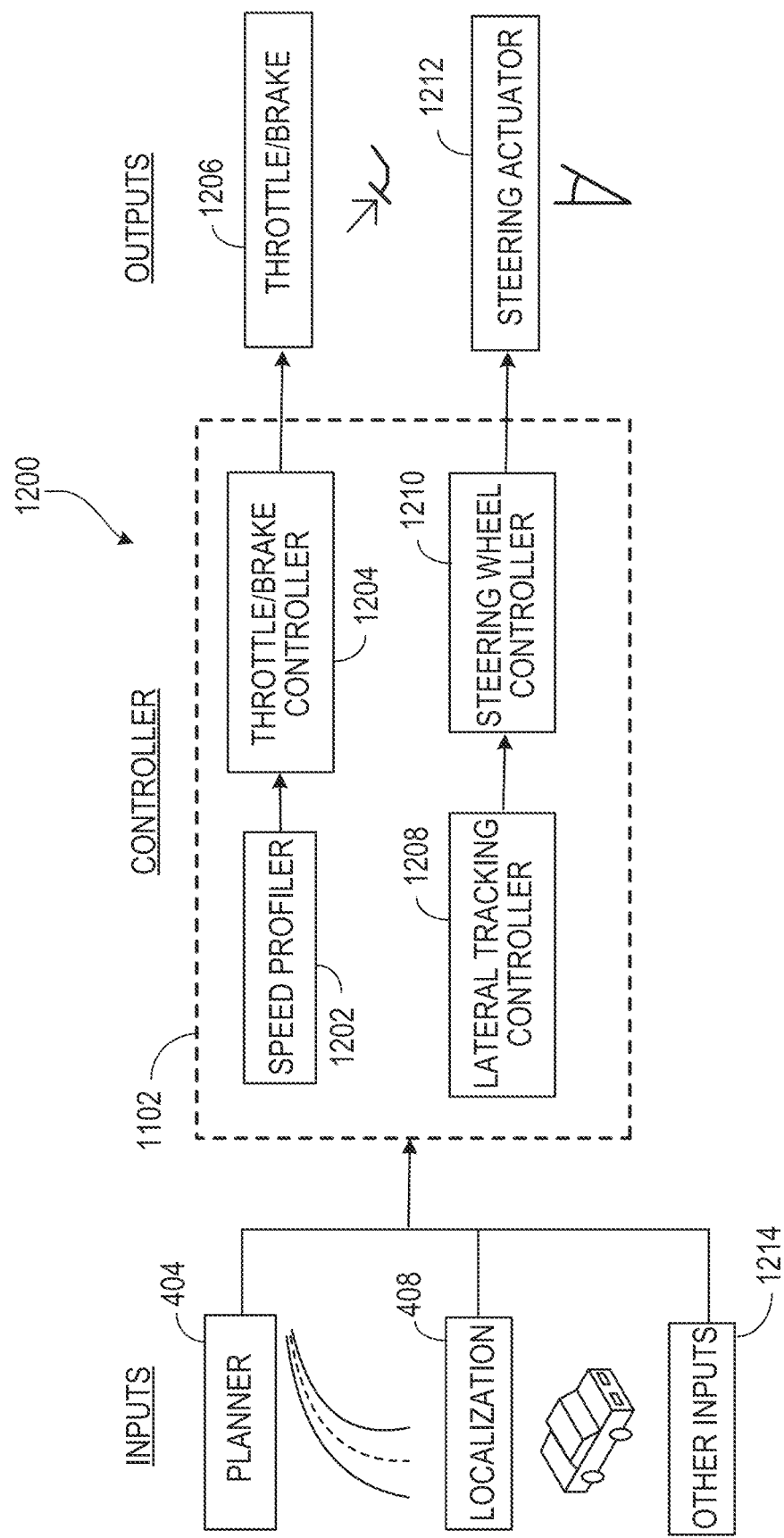
FIG. 12 shows a block diagram of the inputs, outputs, and components of a controller.

FIG. 12 shows a block diagram 1200 of the inputs, outputs, and components of the controller 1102. The controller 1102 has a speed profiler 1202 which affects the operation of a throttle/brake controller 1204. For example, the speed profiler 1202 instructs the throttle/brake controller 1204 to engage acceleration or engage deceleration using the throttle/brake 1206 depending on, e.g., feedback received by the controller 1102 and processed by the speed profiler 1202.

The controller 1102 also has a lateral tracking controller 1208 which affects the operation of a steering controller 1210. For example, the lateral tracking controller 1208 instructs the steering controller 1210 to adjust the position of the steering angle actuator 1212 depending on, e.g., feedback received by the controller 1102 and processed by the lateral tracking controller 1208.

The controller 1102 receives several inputs used to determine how to control the throttle/brake 1206 and steering angle actuator 1212. A planning module 404 provides information used by the controller 1102, for example, to choose a heading when the AV 100 begins operation and to determine which road segment to traverse when the AV 100 reaches an intersection. A localization module 408 provides information to the controller 1102 describing the current location of the AV 100, for example, so that the controller 1102 can determine if the AV 100 is at a location expected based on the manner in which the throttle/brake 1206 and steering angle actuator 1212 are being controlled. In an embodiment, the controller 1102 receives information from other inputs 1214, e.g., information received from databases, computer networks, etc.

Figure 13:
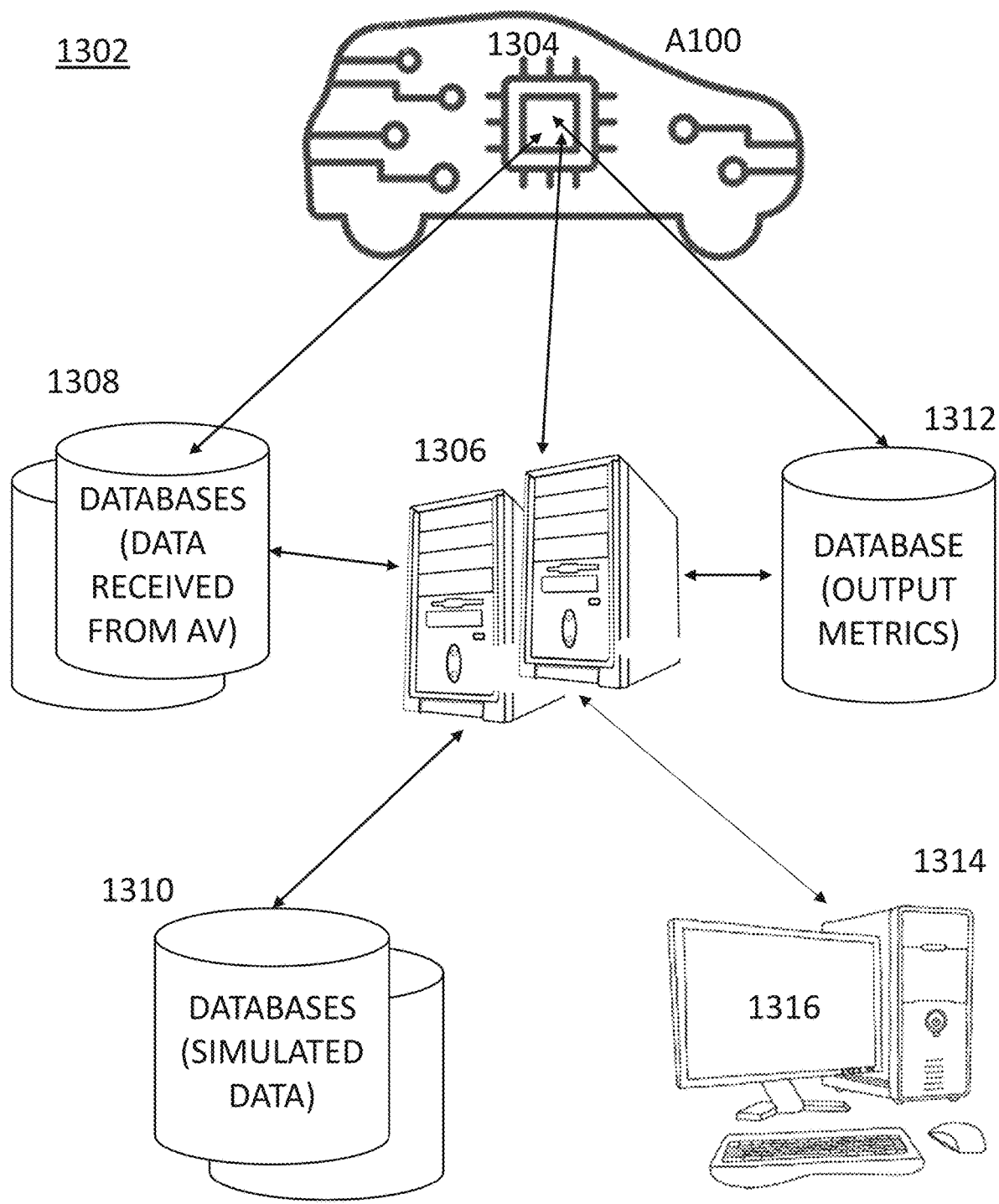
FIG. 13 shows a computing environment to generate simulated data that is used to generate metrics used by the computing device of the AV to make the AV safe and reliable.

Simulation Environment to Improve Safety and Reliability of AV by Reducing Generation of False Positives and False Negatives FIG. 13 shows a computing environment 1302 to generate simulated data that is used to generate metrics used by the computing device 1304 of the AV 100 to make the AV 100 safe and reliable. The computing environment 1302 can include one or more processors 1306, which provide a simulating environment for the AV 100. In some implementations, the computing environment 1302 can be a part of the computing environment 200, and the one or more processors 1306 can be a part of cloud data centers 204a, 204b, and 204c. The one or more processors 1306 can run a parameterizable instruction-level parallelism (ILP) processor simulation acceleration engine (which can also be referred to as a simulator) that can simulate operations of the AV 100 based on data received from the AV 100 to generate simulated data. The one or more processors 1306 can use the simulated data to generate output metrics (also referred to as metrics) that can be used to update programming of the computing device 1304 to make the AV 100 safe and reliable.

The computing environment 1302 can include a database 1308 to store data indicating operation of at least one module (e.g. perception module 402, planning module 404, control module 406, localization module 408, database module 410, and/or any other module) within the computing device 1304. The one or more of the processors 1306 can receive the stored data from the database 1308. The one or more of the processors 1306 can generate, based on the received data, a simulation of the operation of the at least one module to generate simulated data. The generation of the simulation can involve representing the dynamic responses of one or more modules of the AV 100 by the behavior of another system modeled after those one or more modules. In some implementations, the simulation can be a program, which when run, duplicates the functional relationships within and among different modules of the AV 100, thereby executing an analog of the behavior of the AV 100. The results of this simulation are presented in the form of data, which is also referred to as simulated data herein. In some implementations, the simulated data can be updated to obtain simulated data that would have been generated by the operation of the AV in other conditions (i.e. conditions different from those in which the AV was operating), such as if the driving performance was different, different traffic at various points in time, different weather conditions, and/or any other different condition. The one or more of the processors 1306 can store the simulated data in a database 110.

The one or more of the processors 1306 can identify at least one portion of the simulation that indicates a deviation between the collected data and the simulated operation of the AV 100. Such deviation can denote a false positive or a false negative generated by the computing device 1304 during operation of the AV 100. In one implementation, the one or more processors 1306 can identify the portions with deviation as follows. The one or more processors 1306 can feed a first signal comprising time-stamped collected data and a second signal comprising time-stamped simulated data (whose time-stamps are same as time-stamps of the collected data so as to generate accurate comparison) to a comparator, which can generate the comparison that indicates specific portions with deviation. In some implementations, the deviation from such comparison may be detected when the deviation exceeds a threshold value. In some implementations, the comparator can be a hardware electronic device coupled to the one or more processors 1306. In a few implementations, the comparator can be a software (e.g. a software application) communicatively coupled to the one or more processors. The identified portion of the simulation can be simulated data for some time period, which can be a preset time (e.g. 5 seconds, 15 seconds, 30 seconds, 1 minute, 2 minutes, or the like) before a specific event (e.g. when an alert was generated or collision occurred) and another preset time (e.g. 5 seconds, 15 seconds, 30 seconds, 1 minute, 2 minutes, or the like) after the specific event.

The one or more of the processors 1306 can analyze the at least one portion of the simulation to generate metrics for the at least one portion of the simulation. In some examples, the metrics can include specific braking control commands and debug data. The braking control commands can include details of when the AV 100's brakes need to be applied. For example, the braking control commands may specify that brakes be applied when the AV 100 acts or performs in a particular manner—e.g. sensor data, trajectory data, and vehicle state of the AV 100 have preset values, or values within preset ranges—while the AV 100 is operation. The debug data can include programming instructions or details that the computing device can execute to identify instances where deviation between collected data and simulated data is likely to occur, and prevent generation of false positives at those instances.

In some implementations, the one or more processors 1306 can transmit the metrics to the computing device 1304, which may be programmed to use those metrics to generate future instructions for the at least one module so as to avoid another deviation between the collected data and the simulated operation of the AV 100. In other implementations, the one or more processors 1306 can, instead of transmitting the metrics to the computing device 1304, use the metrics to generate future instructions for the at least one module and transmit data characterizing just those instructions to the computing device 1304, which can execute those instructions to avoid another deviation between the collected data and the simulated operation of the AV 100. The one or more processors 1306 can store the metrics in the database 1312.

As noted above, the deviation can denote a false positive generated by the computing device 1304, where the collected data (stored in database 1308) indicates that the computing device 1304 generated an alert for a potential collision while the simulated data (stored in database 1310) indicates that the alert is false. The deviation can denote a false negative generated by the computing device 1304, where the collected data (stored in database 1308) indicates that the computing device 1304 failed to indicate an alert for a potential collision while the simulated data (stored in database 1310) indicates a potential collision. In some implementations, the alert can be activation of one or more lights or audio connected to the computing device 1304 of the AV 100. The alert may be designed to indicate an unanticipated occurrence in vicinity of the AV 100. In a few implementations, the alert may additionally or alternately be any type of notification indicating the unanticipated occurrence, such as an email, a text message, a social media notification, or the like to a driver of the AV 100.

The unanticipated occurrence can be an unanticipated presence of various factors that were not identified or identifiable in advance of planning the trajectory of the AV 100. These factors can include one or more objects or one or more living beings in a path (e.g. planned trajectory) of the AV 100, or weather condition through during the operation of the AV 100. Such objects in the path of the AV 100 can be other vehicles, buildings, constructions signs, or the like. The living beings in the path of the AV 100 can be human beings (e.g. pedestrians, drivers of other vehicles, or any other human beings) or animals (e.g. fleeing animals or wild animals). The unanticipated occurrence can also include an unanticipated blockage caused by various unanticipated factors such as traffic jam, sudden (e.g. within a threshold time) surge in traffic, improper parking of other one or more vehicles, lane closure, narrowing of a road, accident, modification of traffic lanes, malfunctioning traffic signals, and/or any other one or more factors in the planned trajectory of the AV 100.

While the alert is described above as being designed to indicate an unanticipated occurrence in vicinity of the AV 100, in some implementations the alert can include a notification indicating malfunctioning of the computing device 1304. The malfunctioning of the computing device 1304 can include one or more of the following: at least one computer or processor within the computing device 1304 does not start, at least one computer or processor within the computing device 1304 stops operating, the computing device 1304 fails to receive power or stops charging, the at least one computer or processor within the computing device 1304 stops communicating with a screen (e.g. graphical user interface) within the AV 100 so that the screen becomes dysfunctional or blank, the operating system of the computing device 1304 malfunctions, malfunctioning of at least one module (e.g. perception module 402, planning module 404, control module 406, localization module 408, database module 410, and/or any other module) on the computing device 1304, inability of the computing device 1304 to be able to connect to the communication network connecting it to the one or more processors 1306, and/or the like.

In some implementations, the one or more processors 1306 can be coupled to a computing system 1314, which can be a computer that a user (e.g. testing administrator) can use. The computer 1314 can present—e.g. display on a graphical user interface 1316—multiple AVs from which a user (e.g. system administrator, testing engineer, or the like) can select one or more AVs (e.g. AV 100) for which the simulation is to be performed so as to generate metrics to improve the safety and reliability of the selected one or more AVs (e.g. AV 100). In some implementations, the computing system 1314 runs a software application that allows the user to interactively make such selection. Such software application may be serviced on the backend by the one or more processors 1306 (e.g. by the simulator such that this software application is a simulation software application that enables the user to select an AV on which simulation is to be performed). Once the AV 100 has been selected on such software application, the one or more processors 1306 can collect the data from the computing device 1304 so as to commence simulation. In some implementations, the computer 1314 can present—e.g. display on a graphical user interface 1316—one or more options to vary conditions (i.e. vary conditions from those in which the AV was operating) for the simulated data. The varied conditions can be different weather conditions, different traffic at various points in time, and/or any other different condition.

While a manual selection of AV 100 from several AVs is described, in some implementations the selection of AV 100 may be automatic. For example, the one or more processors 1306 may select AVs in a fixed order (e.g. a first AV first, a second AV second, a third AV third, and so on). In some implementations, the one or more processors 1306 may select AVs based on safety of an AV. For instance, AVs may be selected in order of increasing safety—i.e. the least safe AV may be selected first (as it may be more important to make that AV safe and reliable first) and the safest AV may be selected last (as it may be less important to make that AV safe). The safety for any AV may be measured by number of incidents (e.g., accidents) within a past threshold amount of time (e.g. one week, one month, one year, or any other time period in the past, as measured from either the current time or another preset time).

Additionally or alternately, the one or more processors 1306 may automatically select AVs based on reliability of an AV. For instance, AVs may be selected in order of increasing reliability—i.e. the least reliable AV may be selected first (as it may be relatively more important to make that AV safe and reliable first) and the safest AV may be selected last (as it may be less important to make that AV safe). The reliability of an AV may be measured by number of false negatives (as explained above) and/or number of false positives (as also explained above) generated by the computing device of the AV (e.g. computing device 1304 of the AV 100).

Identification of false positives and false negatives can be used to generate metrics, as described above, to prevent the computing device 1304 from generating such false positives or false negatives. Prevention of false positives can reduce (e.g. minimize) the number of false alerts of upcoming collisions as generated by the computing device 1304. Such reduction in number of false alerts can reduce the number of times an unnecessary intervention (e.g. by a driver or a remote controller) is needed during the operation of the AV 100. This enhances the reliability of the AV 100, and instills confidence among drivers in the operations of the AV 100. Furthermore, prevention of false negatives can ensure the computing device 1304 generates proper alerts indicating a potential collision. This can advantageously prevent collisions. Such prevention of collisions can enhance the safety and reliability of the AV 100.

Figure 14:
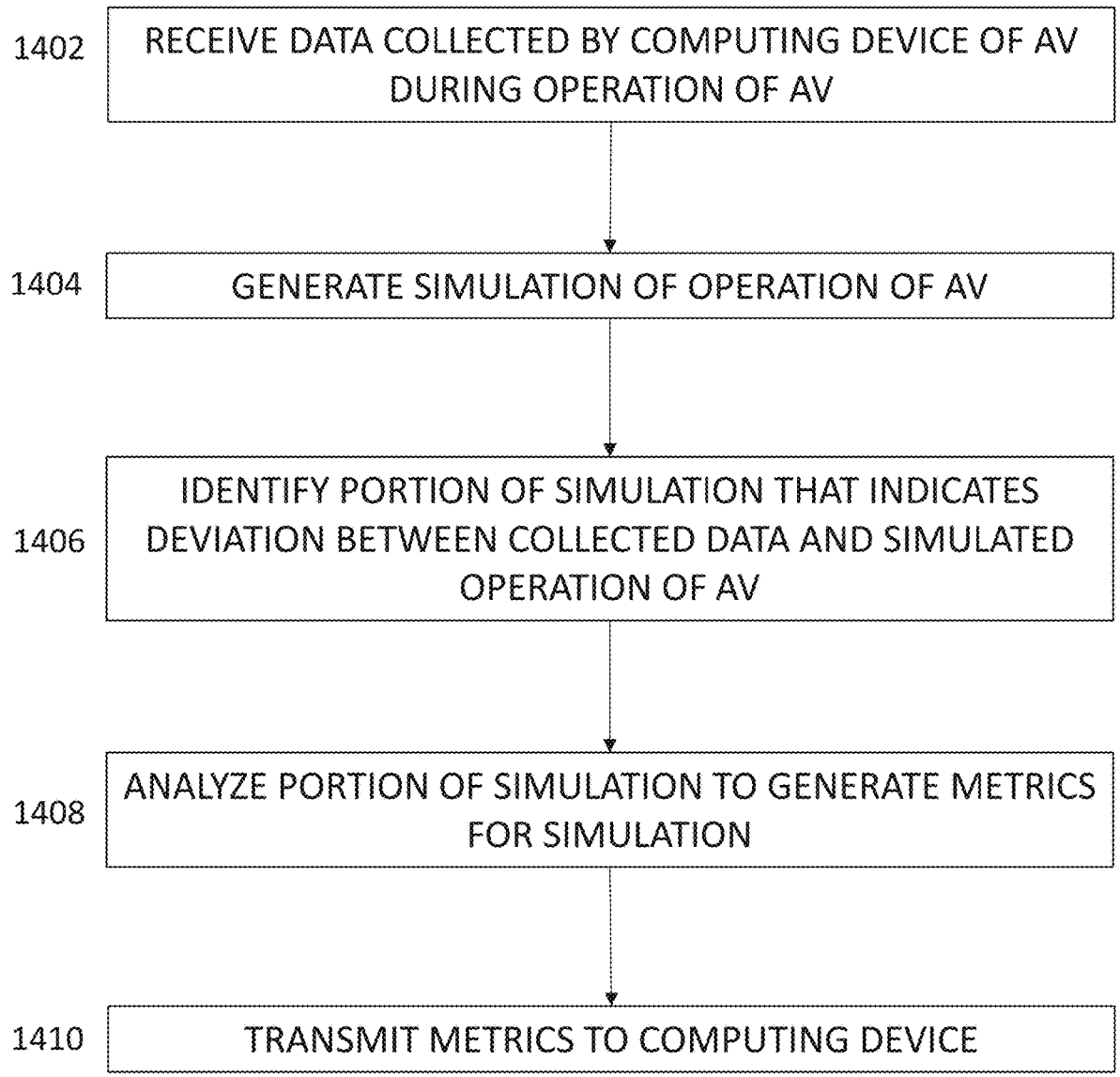
FIG. 14 shows a process for making the AV safe and reliable by reducing false positives and false negatives generated by a computing device of the AV.

FIG. 14 shows a process for making the AV 100 safe and reliable by reducing false positives and false negatives generated by a computing device 1304 of the AV 100. The one or more of the processors 1306 can receive, at 1402, data collected by the computing device 1304 during operation of the AV 100. In one implementation, the one or more of the processors 1306 can receive (which can be in real-time) the data directly from the computing device 1304. In another implementation, the one or more of the processors 1306 can receive the data from the database 1308 that has already received such data and stores such data.

The one or more of the processors 1306 can generate, at 1404 and based on the received data, a simulation of the operation of the at least one module to generate simulated data. The generation of the simulation can involve representing the dynamic responses of one or more modules of the AV 100 by the behavior of another system modeled after those one or more modules. The simulation can be a program, which when run, duplicates the functional relationships within and among different modules of the AV 100, thereby executing an analog of the behavior of the AV 100. The results of this simulation are presented in the form of data, which is also referred to as simulated data herein. The one or more of the processors 1306 can store the simulated data in a database 110.

The one or more of the processors 1306 can identify, at 1406, at least one portion of the simulation that indicates a deviation between the collected data and the simulated data of the AV 100. Such deviation can denote a false positive or a false negative generated by the computing device 1304 during operation of the AV 100. In some examples, the deviation can denote a false positive generated by the computing device 1304, where the collected data (stored in database 1308) indicates that the computing device 1304 generated an alert for a potential collision while the simulated data (stored in database 1310) indicates that the alert is false. In some implementations, the deviation can denote a false negative generated by the computing device 1304, where the collected data (stored in database 1308) indicates that the computing device 1304 failed to indicate an alert for a potential collision while the simulated data (stored in database 1310) indicates a potential collision.

The one or more of the processors 1306 can analyze, at 1408, the at least one portion of the simulation to generate metrics for the at least one portion of the simulation. In some examples, the metrics can include specific braking control commands and debug data. The braking control commands can include details of when the AV 100's brakes need to be applied. For example, the braking control commands may specify that brakes be applied when the AV 100 acts or performs in a particular manner—e.g. sensor data, trajectory data, and vehicle state of the AV 100 have preset values, or values within preset ranges—while the AV 100 is operation. The debug data can include programming instructions or details that the computing device can execute to identify instances where deviation between collected data and simulated data is likely to occur, and prevent generation of false positives at those instances.

The one or more processors 1306 can transmit, at 1410, the metrics to the computing device 1304, which may be programmed to use those metrics to generate future instructions for the at least one module so as to avoid another deviation between the collected data and the simulated operation of the AV 100. In some implementations, the one or more processors 1306 can, instead of transmitting the metrics to the computing device 1304, use the metrics to generate future instructions for the at least one module and transmit data characterizing just those instructions to the computing device 1304, which can execute those instructions to avoid another deviation between the collected data and the simulated operation of the AV 100. The one or more processors 1306 can store the metrics in the database 1312.

Figure 15:
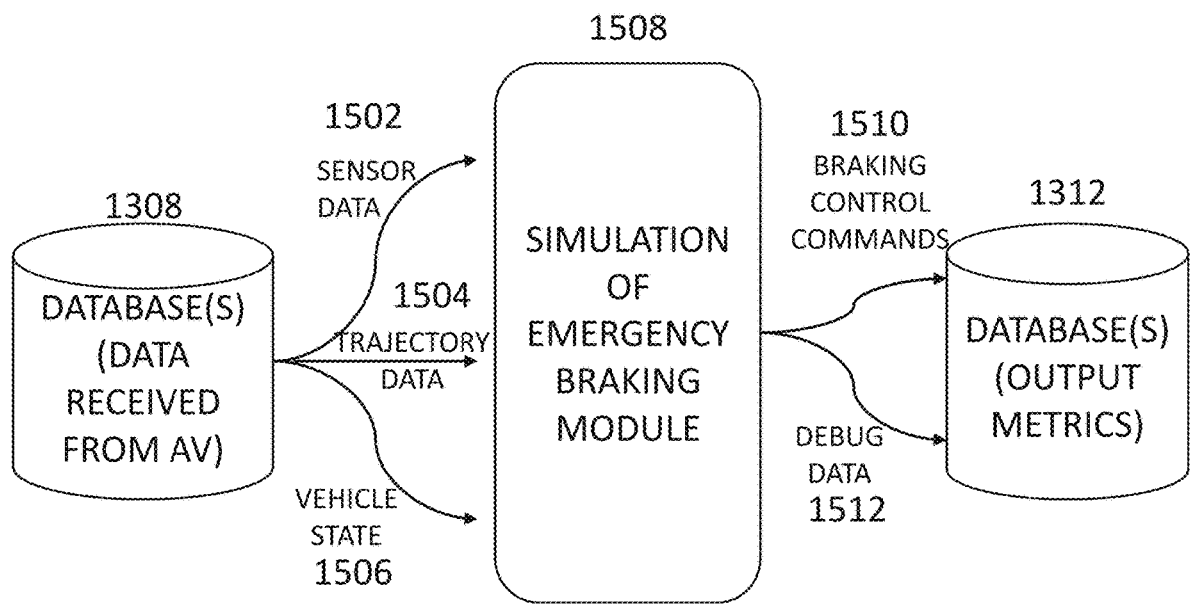
FIG. 15 shows a specific example that avoids false positives generated by the computing device of the AV.

FIG. 15 shows a specific example that avoids false positives generated by the computing device 1310. The data received from the computing device 1304 of the AV 100 include sensor data 1502, trajectory data 1504, and a vehicle state 1506. The sensor data 1502 can be data sensed by the sensors 121 (and can include any other data related to the sensors 121 as noted above). The trajectory data 1504 can be data characterizing trajectory 198 (and can include any other data related to the trajectory 198 as noted above). The vehicle state 1506 can be state or condition of the AV 100, such as the AV's position, linear and angular velocity and acceleration, and heading (e.g., an orientation of the leading end of AV 100).

The one or more processors 1306 can generate a simulation 1508 of a module within the AV 100. In the shown example, this module is an emergency braking module, which can be a part of the control module 406 that controls braking of the AV 100. The generation of the simulation can involve representing the dynamic responses of the emergency braking module of the AV 100 by the behavior of another system modeled after the emergency braking module. In some implementations, the simulation can be a program, which when run, duplicates the functional relationships within the emergency braking module, thereby executing an analog version of the behavior of the emergency braking module. The results of the simulation of the emergency braking module are presented as simulated data. The simulated data can be generated so that it corresponds to (e.g. is generated for same times as) the collected data (here, sensor data 1502, trajectory data 1504, and vehicle state 1506) so that the collected data can be accurately compared with the simulated data. The one or more processors 1306 can store the simulated data in the database 1310.

The one or more processors 1306 can compare the collected data (stored in database 1308) with the simulated data (stored in database 1310) to identify instances (e.g. periods of time) where there is a deviation between the collected data and the simulated data. Here, the deviation can be where the collected data (i.e. sensor data 1502, trajectory data 1504, and vehicle state 1506) indicates that the computing device 1304 generated an alert for a potential collision while the corresponding simulated data (i.e. simulated data analyzed at time points corresponding to those for collected data) indicates that the alert is false (i.e. there was no likelihood of collision, or such likelihood was below a threshold value).

The one or more processors 1306 can evaluate those instances where there is a deviation to generate metrics that prevent future generation of false alerts. Such metrics can include specific braking control commands 1510 and debug data 1512. The braking control commands 1510 can include details of when the AV 100's brakes need to be applied. For example, the braking control commands 1510 may specify that brakes be applied when the sensor data, trajectory data, and vehicle state have preset values (or values within preset ranges). The debug data 1512 can include programming instructions or details that the computing device 1304 can execute to identify instances where deviation between collected data and simulated data is likely to occur, and prevent generation of false positives at those instances.

The one or more processors 1306 can store the metrics in the database 1312. The one or more processors 1306 can subsequently transmit the stored metrics to the computing device 1304. In other implementations, the one or more processors 1306 may directly transmit the metrics to the computing device 1304 (i.e. transmit prior to storage). The metrics include specific instructions (e.g. braking control commands and debug data) to be executed by the emergency braking module, which is a part of the control module 406 that controls braking of the AV 100, so as to avoid false positives.

Figure 16:
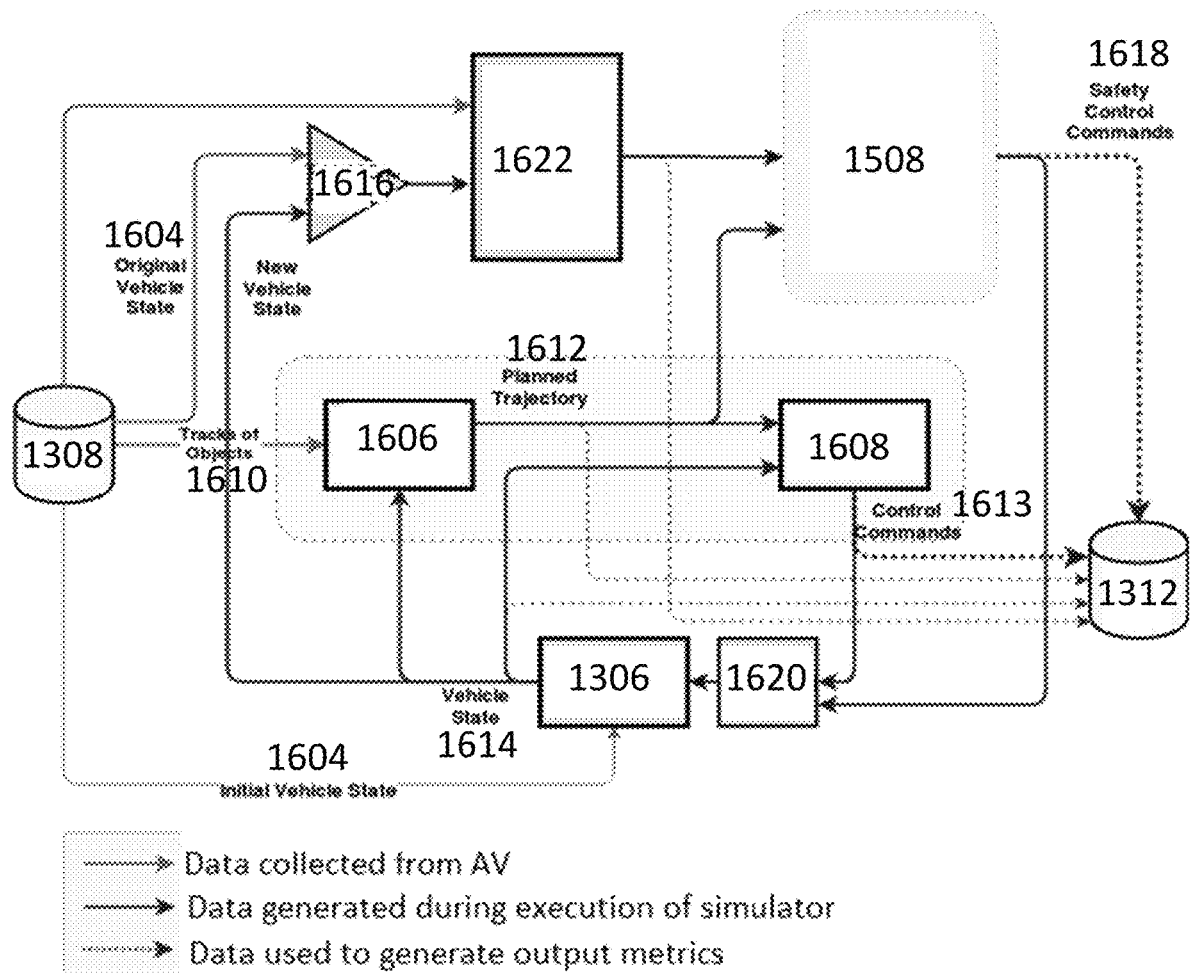
FIG. 16 shows a specific example for avoidance of false negatives by the computing device of the AV.

FIG. 16 shows a specific example for avoidance of false negatives by the computing device 1310 of the AV 100. The one or more 1306 can receive data collected by the computing device 1304 during operation of the AV 100. Here, the data collected by the computing device 1304 is the initial vehicle state 1604. The initial vehicle state 1604 can be state or condition of the AV 100, such as the AV 100's position, linear and angular velocity and acceleration, and heading (e.g., an orientation of the leading end of AV 100). In one implementation, the one or more processors 1306 can receive the initial vehicle state 1604 from the database 1308, as shown, that has already received such initial vehicle state 1604 and stored such initial vehicle state 1604. In another implementation, the one or more processors 1306 can receive (which can be in real-time) the initial vehicle state 1604 directly from the computing device 1304 of the AV 100.

The one or more of the processors 1306 can generate, based on the received vehicle state, a simulation of the operation of the various modules—e.g. simulation 1606 of the planning module 404, simulation 1608 of the control module 406, and simulation 1508 of the emergency braking module 1508. The simulation 1606 can receive tracks of objects 1610 from the database 1308. The tracks of objects 1610 are trajectories of the objects, and can indicate the position of the object over time. The simulations 1606, 1608 and 1508 can generate simulated data (e.g. simulation 1606 of the planning module 404 can generate a simulated planned trajectory 1612, and simulation 1608 of the control module can generate control commands 1613).

The simulations 1606, 1608 and 1508 of respective modules can generate corresponding simulated data, including the simulated vehicle state 1614. The original vehicle state 1604 and the simulated vehicle state 1614 can be fed into a comparator 1616, which can make comparisons to identify at least one portion of the time-stamped simulated data that indicates a deviation between the collected data and the simulated data of the AV 100. The deviation can denote a false negative generated by the computing device 1304, where the original vehicle state 1604 indicates that the computing device 1304 failed to indicate an alert for a potential collision while the simulated vehicle state 1614 indicates a potential collision.

The one or more of the processors 1306 can analyze the simulated data portion identified by the comparator 1616 to generate metrics for the at least one portion of the simulation. The transformation module 1622 can perform coordinate transformations on different data it receives if that data originally had different reference coordinates. These metrics can include safety control commands 1618. The safety control commands 1618 can include, for example, braking control commands 1510. The braking control commands 1510 can include details of when the AV 100's brakes need to be applied. For example, the braking control commands 1510 may specify that brakes be applied when the sensor data, trajectory data, and vehicle state have preset values (or values within preset ranges). The control commands 1613 and 1618 are passed through a multiplexer 1620 to process the control commands before being used further by the one or more processors 1306 to continue the simulation. The one or more processors 1306.

The one or more processors 1306 can transmit the generated metrics to the computing device 1304, which may be programmed to use those metrics to generate future instructions for the at least one module so as to avoid another deviation between the collected data and the simulated operation of the AV 100. In some implementations, the one or more processors 1306 can, instead of transmitting the metrics to the computing device 1304, use the metrics to generate future instructions for the at least one module and transmit data characterizing just those instructions to the computing device 1304, which can execute those instructions to avoid another deviation between the collected data and the simulated operation of the AV 100.

Simulation Environment to Improve Safety and Reliability of AV by Improving Accuracy of a Future Alert Indicating Another Potential Collision In another aspect, the architecture, and components therein, of FIG. 13 can be used to generate a simulation of the AV 100, review the simulated data to identify a portion of the simulation when a takeover from an autopilot mode occurred in response to generation by the computing device of an alert indicating a potential collision, analyze that portion of the simulation to determine metrics indicating whether a collision would have likely occurred (i.e. probability of such collision occurring was more than a threshold value) had the takeover not occurred, and use such metrics to improve accuracy of a future alert indicating another potential collision.

In this aspect, the one or more processors 1306 can receive data collected by the computing device 1304 during operation of the AV 100. The one or more processors 1306 can store the collected data in the database 1308. The one or more processors 1306 can generate, based on the collected data, a simulation of the operation of at least some modules (e.g. planning module and control module) of the AV 100. The generation of the simulation can involve representing the dynamic responses of the at least one module of the AV 100 by the behavior of another system modeled after those modules. In some implementations, the simulation can be a program, which when run, duplicates the functional relationships within and among different modules of the AV 100, thereby executing an analog of the behavior of the AV 100. The results of this simulation are presented in the form of data, which is also referred to as simulated data herein. The one or more processors 1306 can store the simulated data in the database 1310.

The one or more processors 1306 can identify at least one portion of the simulation that indicates a takeover (e.g. by a driver or a remote entity) from an autopilot mode in response to generation by the computing device 1304 of an alert indicating a potential collision. To make such identification, the one or more processors 1306 can determine time-points of the takeovers. In some implementations, a time-point for takeover can be determined as time when related alert was generated by the computing device 1304. The identified portion of the simulation can be simulated data for some time period, which can be a preset time (e.g. 5 seconds, 15 seconds, 30 seconds, 1 minute, 2 minutes, or the like) before a specific event (e.g. when takeover occurred or a related alert was generated) and another preset time (e.g. 5 seconds, 15 seconds, 30 seconds, 1 minute, 2 minutes, or the like) after the specific event.

In some implementations, the alert generated during the takeover can be activation of one or more lights or audio connected to the computing device 1304 of the AV 100. The alert may be designed to indicate an unanticipated occurrence in vicinity of the AV 100. In a few implementations, the alert may additionally or alternatively be any type of notification indicating the unanticipated occurrence, such as an email, a text message, a social media notification, or the like to a driver of the AV 100.

When the alert is generated, the taking over can be by a driver (e.g. safety driver) within the AV 100. The driver can take over by pressing emergency brakes. The taking over can include navigating AV 100 to safety away from an unanticipated occurrence in vicinity of the AV 100. The unanticipated occurrence can include one or more of an unanticipated blockage of a path being traversed by the AV 100, an unanticipated presence of one or more objects or one or more living beings in a path of the AV 100, or an unanticipated weather condition through during the operation of the AV 100.

While the takeover is described as being performed by a driver (e.g. safety driver), in some implementations the takeover can be performed remotely, either by a human user or an automatic backend computer system configured to control one or more modules (e.g. control module 406 that controls braking of the AV 100). In such implementations, the alert can also be triggered by determination (e.g. detection), by the computing device 1304, of change in vitals of a driver by more than a threshold value. The vitals can be pulse rate, respiration rate, blood pressure, or any other vital that can be affected by an impending collision. Such alert can initiate the remote takeover to prevent the collision. For example, if the pulse rate-which is a measurement of the heart rate, or the number of times the heart beats per minute—of the driver is determined to exceed 120 beats per minute (which is significantly above the normal range of 60 to 100 beats per minute for an adult), the remote takeover can be initiated. In some examples, if the respiration rate—i.e. number of breaths a person takes per minute—of the driver is determined to exceed 20 breaths per minute (which is significantly above the normal range of 12 to 16 breaths per minute for an adult), the remote takeover can be initiated. In a few examples, if the blood pressure—i.e. force of the blood pushing against the artery walls during contraction and relaxation of the heart—of an otherwise normal driver (i.e. driver with systolic pressure of less than 120 and diastolic pressure of less than 80) is determined to have a stage 1 blood pressure (i.e. systolic pressure of 130 to 139 or diastolic pressure of 80 to 89) or a stage 2 blood pressure (i.e. systolic pressure of 140 or higher or diastolic pressure of 90 or higher), the remote takeover can be initiated.

The one or more processors 1306 can analyze the at least one portion of the simulated data to determine metrics indicating whether a collision would have likely occurred had the takeover not occurred and control commands to avoid such collision. For example, the metrics can include specific braking control commands, which can include details of when the AV 100's brakes need to be applied so that collision in the absence of a takeover can be avoided. For example, the braking control commands may specify that brakes be applied when the AV 100 acts or performs in a particular manner—e.g. sensor data, trajectory data, and/or vehicle state of the AV 100 have preset values, or values within preset ranges—while the AV 100 is operation. In some implementations, the metrics can further include debug data, which can include programming instructions or details that the computing device can execute to identify instances where collision would have occurred had the takeover not happened, and prevent such collision.

In some implementations, the one or more processors 1306 can transmit the metrics to the computing device 1304, which may be programmed to use those metrics to generate programming instructions to improve accuracy of a future alert indicating another potential collision. In other implementations, the one or more processors 1306 can, instead of transmitting the metrics to the computing device 1304, use the metrics to generate instructions and transmit data characterizing those instructions to the computing device 1304, which can execute those instructions improve accuracy of a future alert indicating another potential collision. The one or more processors 1306 can store the metrics in the database 1312.

The implementations described above are advantageous. For example, as noted above, the metrics can be used to improve the accuracy of a future alert (indicating another potential collision) is improved. Such improvement can in turn reduce the collisions experienced by the AV 100, thereby making the AV 100 safe and more reliable. Further, in some implementations, the alert can initiate an automatic takeover by the remote system, which can be advantageous in cases where there is no human driver, or the human driver is inattentive, careless, and/or suffers a medical issue (e.g. significant difference from normal values of vitals, which can be the case where for example the driver is suffering a heart attack). This further enhances the reliability of the AV 100.

Figure 17:
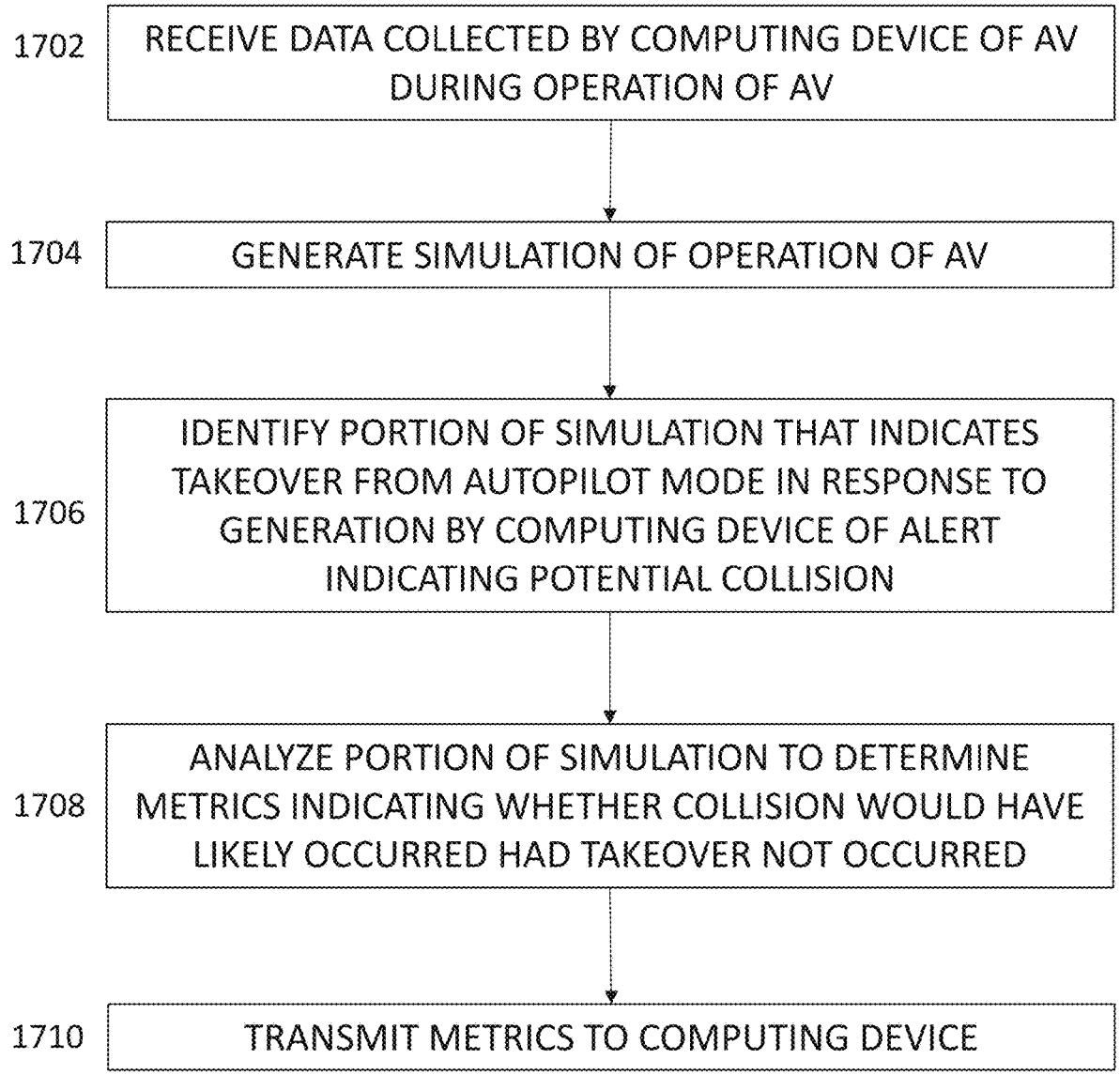
FIG. 17 shows a process of generating metrics to improve accuracy of a future alert indicating another potential collision.

FIG. 17 shows a process of generating metrics to improve accuracy of a future alert indicating another potential collision. The one or more processors 1306 can receive, at 1702, data collected by the computing device 1304 during operation of the AV 100. The one or more processors 1306 can store the received data in the database 1308. The one or more processors 1306 can generate, at 1704 and based on the received data, a simulation of the operation of the AV 100 to generate simulated data. The one or more processors 1306 can store the simulated data in the database 1310. The one or more processors 1306 can identify, at 1706, at least one portion of the simulation that indicates a takeover (e.g. by a driver or a remote entity) from an autopilot mode in response to generation by the computing device 1304 of an alert indicating a potential collision. The one or more processors 1306 can make such identification using signal processing techniques, such as event based analysis in videos and/or images. In some implementations, the alert can be activation of one or more lights or audio connected to the computing device 1304 of the AV 100. The alert may be designed to indicate an unanticipated occurrence in vicinity of the AV 100. In a few implementations, the alert may additionally or alternately be any type of notification indicating the unanticipated occurrence, such as an email, a text message, a social media notification, or the like to a driver of the AV 100.

When the alert is generated, the taking over can be by a driver (e.g. safety driver) within the AV 100. The driver can take over by pressing emergency brakes. The taking over can include navigating AV 100 to safety away from an unanticipated occurrence in vicinity of the AV 100. The unanticipated occurrence can include one or more of an unanticipated blockage of a path being traversed by the AV 100, an unanticipated presence of one or more objects or one or more living beings in a path of the AV 100, or an unanticipated weather condition through during the operation of the AV 100.

While the takeover is described as being performed by a driver (e.g. safety driver), in some implementations the takeover can be performed remotely, either by a human user or an automatic backend computer system configured to control one or more modules (e.g. control module 406 that controls braking of the AV 100). In such implementations, the alert can also be triggered by determination (e.g. detection), by the computing device 1304, of change in vitals of a driver by more than a threshold value. The vitals can be pulse rate, respiration rate, blood pressure, or any other vital that can be affected by an impending collision. Such alert can initiate the remote takeover to prevent the collision. For example, if the pulse rate-which is a measurement of the heart rate, or the number of times the heart beats per minute—of the driver is determined to exceed 120 beats per minute (which is significantly above the normal range of 60 to 100 beats per minute for an adult), the remote takeover can be initiated. In some examples, if the respiration rate—i.e. number of breaths a person takes per minute—of the driver is determined to exceed 20 breaths per minute (which is significantly above the normal range of 12 to 16 breaths per minute for an adult), the remote takeover can be initiated. In a few examples, if the blood pressure—i.e. force of the blood pushing against the artery walls during contraction and relaxation of the heart—of an otherwise normal driver (i.e. driver with systolic pressure of less than 120 and diastolic pressure of less than 80) is determined to have a stage 1 blood pressure (i.e. systolic pressure of 130 to 139 or diastolic pressure of 80 to 89) or a stage 2 blood pressure (i.e. systolic pressure of 140 or higher or diastolic pressure of 90 or higher), the remote takeover can be initiated.

The one or more processors 1306 can analyze, at 1708, the at least one portion of the simulated data to determine metrics indicating whether a collision would have likely occurred had the takeover not taken place and control commands to avoid such collision. For example, the metrics can include specific braking control commands, which can include details of when the AV 100's brakes need to be applied so that collision in the absence of a takeover can be avoided. For example, the braking control commands may specify that brakes be applied when the AV 100 acts or performs in a particular manner—e.g. sensor data, trajectory data, and/or vehicle state of the AV 100 have preset values, or values within preset ranges—while the AV 100 is operation. In some implementations, the metrics can further include debug data, which can include programming instructions or details that the computing device can execute to identify instances where collision would have occurred had the takeover not happened, and prevent such collision.

In some implementations, the one or more processors 1306 can transmit, at 1710, the metrics to the computing device 1304, which may be programmed to use those metrics to generate future instructions to improve accuracy of a future alert indicating another potential collision. In other implementations, the one or more processors 1306 can, instead of transmitting the metrics to the computing device 1304, use the metrics to generate instructions and transmit data characterizing those instructions to the computing device 1304, which can execute those instructions improve accuracy of a future alert indicating another potential collision. The one or more processors 1306 can store the metrics in the database 1312.

The implementations described above are advantageous. For example, as noted above, the metrics can be used to improve the accuracy of a future alert (indicating another potential collision) is improved. Such improvement can in turn reduce the collisions experienced by the AV 100, thereby making the AV 100 safe and more reliable. Further, in some implementations, the alert can initiate an automatic takeover by the remote system, which can be advantageous in cases where there is no human driver, or the human driver is inattentive, careless, and/or suffers a medical issue (e.g. significant difference from normal values of vitals, which can be the case where for example the driver is suffering a heart attack). This further enhances the reliability of the AV 100.

Figure 18:
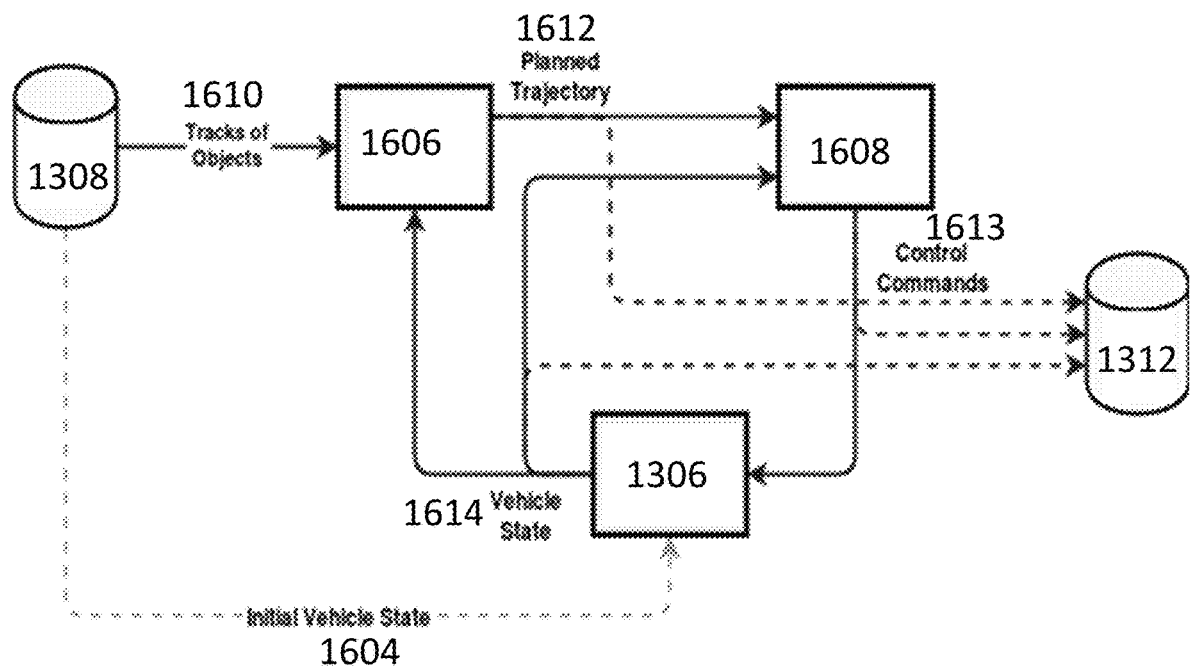
FIG. 18 shows an example of a computing landscape for generation of metrics to improve accuracy of a future alert indicating another potential collision.

FIG. 18 shows a process of generating metrics to improve accuracy of a future alert indicating another potential collision. The one or more processors 1306 can receive, from the database 1308, data collected by the computing device 1304—e.g. initial vehicle state 1604—during operation of the AV 100. In an alternate implementation, the one or more processors 1306 can receive the initial vehicle state 1604 directly from the computing device 1304 of the AV 100. The initial vehicle state 1604 can be state or condition of the AV 100, such as the AV 100's position, linear and angular velocity and acceleration, and heading (e.g., an orientation of the leading end of AV 100).

The one or more processors 1306 can generate, based on the received data, simulations 1606 and 1608 of operations of the planning module 1606 and the control module 1608 of the AV 100 to generate simulated data. The simulation 1606 can receive tracks of objects 1610 from the database 1308. The tracks of objects 1610 are trajectories of the objects, and can indicate the position of the object over time. The simulations 1606 and 1608 can generate simulated data (e.g. simulation 1606 of the planning module 404 can generate a simulated planned trajectory 1612, and simulation 1608 of the control module can generate control commands 1613). The simulations 1606 and 1608 of respective modules can generate corresponding simulated data, including the simulated vehicle state 1614. The one or more processors 1306 can provide the simulated data to update the simulation 1606 of the planning module 404.

The one or more processors 1306 can identify at least one portion of the simulated data that indicates a takeover (e.g. by a driver or a remote entity) from an autopilot mode in response to generation by the computing device 1304 of an alert indicating a potential collision. In some implementations, the alert can be activation of one or more lights or audio connected to the computing device 1304 of the AV 100. The alert may be designed to indicate an unanticipated occurrence in vicinity of the AV 100. In a few implementations, the alert may additionally or alternately be any type of notification indicating the unanticipated occurrence, such as an email, a text message, a social media notification, or the like to a driver of the AV 100.

When the alert is generated, the taking over can be by a driver (e.g. safety driver) within the AV 100. The driver can take over by pressing emergency brakes. The taking over can include navigating AV 100 to safety away from an unanticipated occurrence in vicinity of the AV 100. The unanticipated occurrence can include one or more of an unanticipated blockage of a path being traversed by the AV 100, an unanticipated presence of one or more objects or one or more living beings in a path of the AV 100, or an unanticipated weather condition through during the operation of the AV 100.

While the takeover is described as being performed by a driver (e.g. safety driver), in some implementations the takeover can be performed remotely, either by a human user or an automatic backend computer system configured to control one or more modules (e.g. control module 406 that controls braking of the AV 100). In such implementations, the alert can also be triggered by determination (e.g. detection), by the computing device 1304, of change in vitals of a driver by more than a threshold value. The vitals can be pulse rate, respiration rate, blood pressure, or any other vital that can be affected by an impending collision. Such alert can initiate the remote takeover to prevent the collision. For example, if the pulse rate-which is a measurement of the heart rate, or the number of times the heart beats per minute—of the driver is determined to exceed 120 beats per minute (which is significantly above the normal range of 60 to 100 beats per minute for an adult), the remote takeover can be initiated. In some examples, if the respiration rate—i.e. number of breaths a person takes per minute—of the driver is determined to exceed 20 breaths per minute (which is significantly above the normal range of 12 to 16 breaths per minute for an adult), the remote takeover can be initiated. In a few examples, if the blood pressure—i.e. force of the blood pushing against the artery walls during contraction and relaxation of the heart—of an otherwise normal driver (i.e. driver with systolic pressure of less than 120 and diastolic pressure of less than 80) is determined to have a stage 1 blood pressure (i.e. systolic pressure of 130 to 139 or diastolic pressure of 80 to 89) or a stage 2 blood pressure (i.e. systolic pressure of 140 or higher or diastolic pressure of 90 or higher), the remote takeover can be initiated.

The one or more processors 1306 can analyze, at 1708, the at least one portion of the simulated data to determine metrics indicating whether a collision would have likely occurred had the takeover not taken place and control commands to avoid such collision. For example, the metrics can include specific braking control commands, which can include details of when the AV 100's brakes need to be applied so that collision in the absence of a takeover can be avoided. For example, the braking control commands may specify that brakes be applied when the AV 100 acts or performs in a particular manner—e.g. sensor data, trajectory data, and/or vehicle state of the AV 100 have preset values, or values within preset ranges—while the AV 100 is operation. In some implementations, the metrics can further include debug data, which can include programming instructions or details that the computing device can execute to identify instances where collision would have occurred had the takeover not happened, and prevent such collision.

In some implementations, the one or more processors 1306 can transmit, at 1710, the metrics to the computing device 1304, which may be programmed to use those metrics to generate future instructions to improve accuracy of a future alert indicating another potential collision. In other implementations, the one or more processors 1306 can, instead of transmitting the metrics to the computing device 1304, use the metrics to generate instructions and transmit data characterizing those instructions to the computing device 1304, which can execute those instructions improve accuracy of a future alert indicating another potential collision. The one or more processors 1306 can store the metrics in the database 1312.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor may receive instructions and data from a read only memory or a random access memory or both. Elements of a computer can include a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and any input from the user may be received in any appropriate form, including acoustic, speech, or tactile input.

Implementations may be realized in a computing system that includes a back end component, e.g., as a data server, or that includes a middleware component, e.g., an application server, or that includes a front end component, e.g., a client computer having a graphical user interface or a web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claim(s).

In the description herein, various embodiments have been described with reference to numerous specific details that may vary from implementation to implementation. The description and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously-recited step or entity.

The invention claimed is:

1. A method comprising:
   receiving, by one or more processors, data collected by a computing device of an autonomous vehicle during operation of the autonomous vehicle;
   generating, by the one or more processors and based on the received data, a simulation of the operation of the autonomous vehicle;
   identifying, by the one or more processors, at least one portion of the simulation that indicates a deviation between the collected data and the simulated operation of the autonomous vehicle;
   analyzing, by the one or more processors, the at least one portion of the simulation to generate metrics for the at least one portion of the simulation; and
   transmitting, by the one or more processors, the metrics to the computing device, wherein the computing device is configured to use the metrics to avoid another deviation between the collected data and the simulated operation of the autonomous vehicle.

2. The method of claim 1, wherein the deviation between the collected data and the simulated operation of the autonomous vehicle occurs where the collected data indicates that the computing device indicated an alert for a potential collision while the simulated operation indicates that the alert is false.

3. The method of claim 2, wherein the alert comprises a notification indicating an unanticipated occurrence in vicinity of the autonomous vehicle.

4. The method of claim 3, wherein the unanticipated occurrence comprises one or more of an unanticipated blockage of a path being traversed by the autonomous vehicle, an unanticipated presence of one or more objects or one or more living beings in a path of the autonomous vehicle, or an unanticipated weather condition through during the operation of the autonomous vehicle.

5. The method of claim 2, wherein the alert comprises a notification indicating malfunctioning of the computing device.

6. The method of claim 1, wherein the deviation between the collected data and the simulated operation of the autonomous vehicle occurs where the collected data indicates that the computing device failed to indicate an alert for a potential collision while the simulated operation indicates a potential collision.

7. The method of claim 6, wherein the alert comprises a notification indicating an unanticipated occurrence in vicinity of the autonomous vehicle.

8. The method of claim 7, wherein the unanticipated occurrence comprises one or more of an unanticipated blockage of a path being traversed by the autonomous vehicle, an unanticipated presence of one or more objects or one or more living beings in a path of the autonomous vehicle, or an unanticipated weather condition through during the operation of the autonomous vehicle.

9. The method of claim 6, wherein the alert comprises a notification indicating malfunctioning of the computing device.

10. The method of claim 1, further comprising storing the data collected by the computing device in a database,
wherein the receiving of the collected data by the one or more processors comprises receiving the collected data from the database.

11. The method of claim 1, wherein the one or more processors implement a user interface that allows a user to select the autonomous vehicle from a plurality of autonomous vehicles displayed on the user interface, the selection by the user being performed prior to the receiving of the collected data by one or more processors.

12. A system comprising:
a first database to store data indicating and collected from operation of at least one module within a computing device of an autonomous vehicle;
a simulator comprising one or more processors, wherein the one or more processors are configured to:
receive the stored data from the first database;
generate, based on the received data, a simulation of the operation of the at least one module;
identify at least one portion of the simulation that indicates a deviation between the collected data and the simulated operation of the autonomous vehicle; and
analyze the at least one portion of the simulation to generate metrics for the at least one portion of the simulation, wherein the metrics can be used to avoid another deviation between the collected data and the simulated operation of the autonomous vehicle; and
a second database configured to store the metrics.

13. The system of claim 12, wherein the computing device is configured to use the metrics stored in the second database to avoid another deviation between the collected data and the simulated operation of the autonomous vehicle.

14. The system of claim 12, wherein the at least one module comprises an autonomous vehicle emergency braking (AVEB) module configured to determine whether a brake of the autonomous vehicle is to be activated at a particular instant during operation of the autonomous vehicle.

15. The system of claim 14, wherein the metrics stored in the second database are used to generate an updated determination of whether the brake of the autonomous vehicle is to be activated at the particular instant during operation of the autonomous vehicle, wherein the updated determination is used to avoid the other deviation between the collected data and the simulated operation of the autonomous vehicle.

16. The system of claim 12, wherein:
the computing device of the autonomous vehicle further comprises a planning module and a control module;
the simulation of the operation of the at least one module comprises a simulation of the planning module and the control module; and
the metrics stored in the second database indicate functioning of the planning module and the control module to avoid the other deviation between the collected data and the simulated operation of the autonomous vehicle.

17. A non-transitory computer program product storing instructions that, when executed by at least one programmable processor, cause the at least one programmable processor to perform operations comprising:
receiving data collected by a computing device of an autonomous vehicle during operation of the autonomous vehicle;
generating, based on the received data, a simulation of the operation of the autonomous vehicle;
identifying at least one portion of the simulation that indicates a deviation between the collected data and the simulated operation of the autonomous vehicle;
analyzing the at least one portion of the simulation to generate metrics for the at least one portion of the simulation; and
transmitting the metrics to the computing device, wherein the computing device is configured to use the metrics to avoid another deviation between the collected data and the simulated operation of the autonomous vehicle.

18. A method comprising:
receiving, by one or more processors, data collected by a computing device of an autonomous vehicle during operation of the autonomous vehicle;
generating, by the one or more processors and based on the received data, a simulation of the operation of the autonomous vehicle;
identifying, by the one or more processors, at least one portion of the simulation that indicates a takeover from an autopilot mode in response to generation by the computing device of an alert indicating a potential collision;
analyzing, by the one or more processors, the at least one portion of the simulation to determine metrics indicating whether a collision would have likely occurred had the takeover not occurred; and
transmitting, by the one or more processors, the metrics to the computing device, wherein the computing device is configured to use the metrics to improve accuracy of a future alert indicating another potential collision.

19. The method of claim 18, wherein the taking over by the driver comprises pressing of emergency brakes by the safety driver.

20. The method of claim 18, wherein the taking over by the driver comprises navigating the autonomous vehicle to safety away from an unanticipated occurrence in vicinity of the autonomous vehicle.

21. The method of claim 20, wherein the unanticipated occurrence comprises one or more of a an unanticipated blockage of a path being traversed by the autonomous vehicle, an unanticipated presence of one or more objects or one or more living beings in a path of the autonomous vehicle, or an unanticipated weather condition through during the operation of the autonomous vehicle.

22. The method of claim 18, wherein the takeover is by a driver of the autonomous vehicle.

23. The method of claim 18, wherein the takeover is by a computer coupled to the computing device via a communication network and is configured to remotely control the operation of the autonomous vehicle.

24. The method of claim 18, wherein the computing device generates the alert in response to detecting that vitals of a driver of the autonomous vehicle have changed more than a threshold value, wherein the takeover is by a computer coupled to the computing device via a communication network and is configured to remotely control the operation of the autonomous vehicle.

25. The method of claim 18, further comprising storing the data collected by the computing device in a database,
wherein the receiving of the collected data by the one or more processors comprises receiving the collected data from the database.

26. The method of claim 18, wherein the one or more processors implement a user interface that allows a user to select the autonomous vehicle from a plurality of autonomous vehicles, the selection by the user being performed prior to the receiving of the collected data by one or more processors.

27. A system comprising:
a first database configured to store data received from a computing device of an autonomous vehicle, wherein the stored data indicates operation of the autonomous vehicle;
a simulator comprising one or more processors, wherein the one or more processors are configured to:
receive the stored data from the database;
generate, based on the received data, a simulation of the operation of the autonomous vehicle;
identify at least one portion of the simulation that indicates a takeover from an autopilot mode in response to generation by the computing device of an alert indicating a potential collision;
analyze the at least one portion of the simulation to determine metrics indicating whether a collision would have likely occurred had the takeover not occurred; and
a second database configured to store the metrics.

28. The system of claim 27, wherein the computing device is configured to use the metrics stored in the second database to improve accuracy of a future alert indicating another potential collision.

29. The system of claim 27, wherein:
the computing device of the autonomous vehicle comprises a planning module and a control module;
the simulation of the operation of the autonomous vehicle comprises a simulation of the planning module and the control module; and
the metrics stored in the second database indicate functioning of the planning module and the control module to improve accuracy of a future alert indicating another potential collision.

30. The system of claim 29, wherein each of the planning module and the control module is a software module implemented on a respective processor.

31. A non-transitory computer program product storing instructions that, when executed by at least one programmable processor, cause the at least one programmable processor to perform operations comprising:
receiving data collected by a computing device of an autonomous vehicle during operation of the autonomous vehicle;
generating, based on the received data, a simulation of the operation of the autonomous vehicle;
identifying at least one portion of the simulation that indicates a takeover from an autopilot mode in response to generation by the computing device of an alert indicating a potential collision;
analyzing the at least one portion of the simulation to determine metrics indicating whether a collision would have likely occurred had the takeover not occurred; and
transmitting the metrics to the computing device, wherein the computing device is configured to use the metrics to improve accuracy of a future alert indicating another potential collision.

* * * * *